US012372227B2

(12) United States Patent
Kohen

(10) Patent No.: US 12,372,227 B2
(45) Date of Patent: Jul. 29, 2025

(54) RECESSING SMART QUICK CONNECT DEVICES

(71) Applicant: SKYX Platforms Corp., Johns Creek, GA (US)

(72) Inventor: Ran Roland Kohen, Aventura, FL (US)

(73) Assignee: SKYX Platforms Corp., Johns Creek, GA (US)

( * ) Notice: Subject to any disclaimer, the term of this patent is extended or adjusted under 35 U.S.C. 154(b) by 123 days.

(21) Appl. No.: 17/907,753

(22) PCT Filed: Mar. 1, 2021

(86) PCT No.: PCT/US2021/020233
§ 371 (c)(1),
(2) Date: Aug. 29, 2022

(87) PCT Pub. No.: WO2021/174187
PCT Pub. Date: Sep. 2, 2021

(65) Prior Publication Data

US 2023/0204200 A1 Jun. 29, 2023

Related U.S. Application Data

(60) Provisional application No. 62/983,055, filed on Feb. 28, 2020.

(51) Int. Cl.
*F21V 23/06* (2006.01)
*F21K 9/20* (2016.01)
(Continued)

(52) U.S. Cl.
CPC ................ *F21V 23/06* (2013.01); *F21K 9/20* (2016.08); *F21S 8/026* (2013.01); *F21V 21/04* (2013.01); *H01R 13/6275* (2013.01)

(58) Field of Classification Search
CPC .. F21V 23/06; F21V 21/04; F21K 9/20; F21S 8/026; H01R 13/6275
See application file for complete search history.

(56) References Cited

U.S. PATENT DOCUMENTS

| | | | |
|---|---|---|---|
| 484,911 | A | 10/1892 | Green |
| 1,595,972 | A | 8/1926 | DeReamer |

(Continued)

FOREIGN PATENT DOCUMENTS

| | | | |
|---|---|---|---|
| CA | 2 549 756 | A1 | 12/2007 |
| CN | 2586059 | Y | 11/2003 |

(Continued)

OTHER PUBLICATIONS

For Russian Patent Application 2017142137 (national Stage of PCT/US2016/032170): Prosecution history including decision to grant dated Oct. 25, 2019.

(Continued)

*Primary Examiner* — Evan P Dzierzynski
(74) *Attorney, Agent, or Firm* — Fleit Intellectual Property Law; Paul D. Bianco

(57) ABSTRACT

A fixture is sized to be inserted into an electrical junction box having a socket. The fixture has a plug with conductive terminals that are mateable with the socket to connect the fixture to an electrical signal connected to the socket. An end of the fixture with the plug is inserted into the junction box to mate with the socket. A release latch extends from the plug so that an end of the latch is not recessed within the junction box, and can be pushed to release the plug and fixture for removal. The socket is attached to extension arms that are attachable to the junction box, so that the socket can be positioned at the correct height within the box to properly mate with the plug of the fixture after insertion.

19 Claims, 6 Drawing Sheets

(51) Int. Cl.
*F21S 8/02* (2006.01)
*F21V 21/04* (2006.01)
*H01R 13/627* (2006.01)

(56) References Cited

U.S. PATENT DOCUMENTS

| | | | |
|---|---|---|---|
| 1,897,954 | A | 2/1933 | D'Olier |
| 2,077,587 | A | 4/1937 | Raymond |
| 2,308,016 | A | 1/1943 | Mihalyi |
| 2,313,481 | A | 3/1943 | Rendano |
| 2,494,428 | A | 1/1950 | Buck |
| 2,673,966 | A | 3/1954 | Larkin |
| 2,726,372 | A | 12/1955 | Appleton |
| 2,728,895 | A | 12/1955 | Quackenbush |
| 2,863,037 | A | 12/1958 | Johnstone |
| 3,056,035 | A | 9/1962 | Bernheim |
| 3,118,713 | A | 1/1964 | Ellis |
| 3,159,444 | A | 12/1964 | Stine |
| 3,193,636 | A | 7/1965 | Daniels |
| 3,386,071 | A | 5/1968 | Allen |
| 3,398,260 | A | 8/1968 | Martens |
| 3,521,216 | A | 7/1970 | Tolegian |
| 3,585,564 | A | 6/1971 | Skjervoll |
| 3,648,002 | A | 3/1972 | Du Rocher |
| 3,651,443 | A | 3/1972 | Quilez |
| 3,668,603 | A | 6/1972 | Burgess et al. |
| 3,798,584 | A | 3/1974 | Person |
| 3,808,577 | A | 4/1974 | Mathauser |
| 3,813,478 | A | 5/1974 | Ervin |
| 3,855,564 | A | 12/1974 | Dumas |
| 3,871,732 | A | 3/1975 | Appleton |
| 4,059,327 | A | 11/1977 | Vann |
| 4,079,244 | A | 3/1978 | Bortoluzzi |
| 4,083,619 | A | 4/1978 | McCormick et al. |
| 4,107,770 | A | 8/1978 | Weber |
| 4,133,594 | A | 1/1979 | Laverick et al. |
| 4,335,927 | A | 6/1982 | Allen et al. |
| 4,448,388 | A | 5/1984 | Dennis |
| 4,462,653 | A | 7/1984 | Flederbach |
| 4,473,869 | A | 9/1984 | De Widt |
| 4,588,248 | A | 5/1986 | Moore |
| 4,629,843 | A | 12/1986 | Kato et al. |
| 4,631,648 | A | 12/1986 | Nilssen |
| 4,681,385 | A | 7/1987 | Kruger et al. |
| 4,753,600 | A | 6/1988 | Williams |
| 5,003,128 | A | 3/1991 | Grondin |
| 5,034,869 | A | 7/1991 | Choi |
| 5,173,053 | A | 12/1992 | Swanson et al. |
| 5,250,874 | A | 10/1993 | Hall et al. |
| 5,352,122 | A | 10/1994 | Speyer |
| 5,362,122 | A | 11/1994 | Reihl et al. |
| 5,438,216 | A | 8/1995 | Juskey et al. |
| 5,442,532 | A | 8/1995 | Boulos |
| 5,442,632 | A | 8/1995 | Boulos et al. |
| 5,494,325 | A | 2/1996 | Liu et al. |
| 5,494,326 | A | 2/1996 | Hinds |
| 5,536,685 | A | 7/1996 | Burward-Hoy |
| 5,551,882 | A | 9/1996 | Whiteman |
| 5,562,458 | A | 10/1996 | Stora et al. |
| 5,584,726 | A | 12/1996 | Le Gallic et al. |
| 5,600,537 | A | 2/1997 | Gordin |
| 5,622,873 | A | 4/1997 | Kim et al. |
| 5,668,920 | A | 9/1997 | Pelonis |
| 5,710,541 | A | 1/1998 | Stanley |
| 5,754,408 | A | 5/1998 | Derouiche |
| 5,777,391 | A | 7/1998 | Nakamura et al. |
| 5,790,381 | A | 8/1998 | Derouiche et al. |
| 5,803,590 | A | 9/1998 | Wedell et al. |
| 5,808,556 | A | 9/1998 | Nelson |
| 5,836,781 | A | 11/1998 | Hyzin |
| 5,952,714 | A | 9/1999 | Sano et al. |
| 5,962,810 | A | 10/1999 | Glenn |
| 6,064,155 | A | 5/2000 | Maya |
| 6,068,490 | A | 5/2000 | Salzberg |
| 6,093,029 | A | 7/2000 | Kwon et al. |
| 6,129,598 | A | 10/2000 | Yu et al. |
| 6,135,800 | A | 10/2000 | Majors |
| 6,170,967 | B1 | 1/2001 | Usher et al. |
| 6,175,159 | B1 | 1/2001 | Sasaki |
| 6,240,247 | B1 | 5/2001 | Reiker |
| 6,241,559 | B1 | 6/2001 | Taylor |
| 6,325,654 | B1 * | 12/2001 | Kerr, Jr. ................ F04D 25/088 439/313 |
| 6,332,794 | B1 | 12/2001 | Tzeng Jeng |
| 6,340,790 | B1 | 1/2002 | Gordin et al. |
| 6,364,716 | B1 | 4/2002 | Seo |
| 6,366,733 | B1 | 4/2002 | Reiker |
| 6,398,392 | B2 | 6/2002 | Gordin et al. |
| 6,422,722 | B1 | 7/2002 | Voltolina |
| 6,517,223 | B2 | 2/2003 | Hsu |
| 6,595,782 | B1 | 7/2003 | Hsiao |
| 6,598,990 | B2 | 7/2003 | Li |
| 6,631,243 | B2 | 10/2003 | Reiker |
| 6,648,488 | B1 | 11/2003 | Pearce |
| 6,751,406 | B2 | 6/2004 | Reiker |
| 6,793,383 | B2 | 9/2004 | Wu |
| 6,821,089 | B2 | 11/2004 | Bilskie |
| 6,837,754 | B1 | 1/2005 | Walton |
| 6,930,250 | B1 | 8/2005 | Drane |
| 6,962,498 | B2 | 11/2005 | Kohen |
| 7,052,301 | B2 | 5/2006 | Garcia et al. |
| 7,066,739 | B2 | 6/2006 | McLeish |
| 7,192,303 | B2 | 3/2007 | Kohen |
| 7,462,066 | B2 | 12/2008 | Kohen |
| 7,467,881 | B2 | 12/2008 | McMillen |
| 7,569,710 | B1 | 8/2009 | Ozero |
| 7,706,757 | B2 | 4/2010 | Luglio et al. |
| 7,723,862 | B1 | 5/2010 | Spillman et al. |
| 7,878,691 | B2 | 2/2011 | Liang |
| 7,891,841 | B2 | 2/2011 | Levine |
| 8,123,378 | B1 | 2/2012 | Ruberg et al. |
| 8,186,852 | B2 | 5/2012 | Dassanayake et al. |
| 8,192,057 | B2 | 6/2012 | Dassanayake et al. |
| 8,235,549 | B2 * | 8/2012 | Gingrich, III ............ F21K 9/20 362/651 |
| 8,277,082 | B2 | 10/2012 | Dassanayake et al. |
| 8,348,678 | B2 | 1/2013 | Hardisty |
| 8,354,768 | B2 | 1/2013 | Cipriani |
| 8,357,016 | B2 | 1/2013 | Schumacher |
| 8,419,218 | B2 | 4/2013 | Dassanayake et al. |
| 8,449,137 | B2 | 5/2013 | Dassanayake et al. |
| 8,558,413 | B1 | 10/2013 | Lepard |
| D693,765 | S | 11/2013 | Workman |
| 8,702,435 | B2 | 4/2014 | Tajima |
| 8,854,796 | B2 * | 10/2014 | Wilcox ................. F21V 23/001 361/641 |
| 8,888,326 | B2 | 11/2014 | Hatch |
| 8,894,247 | B2 | 11/2014 | Kim et al. |
| 8,979,347 | B2 | 3/2015 | Holman |
| 9,328,910 | B2 | 5/2016 | Lin et al. |
| 9,500,352 | B2 | 11/2016 | Van Winkle |
| 9,644,824 | B2 | 5/2017 | Dassanayake et al. |
| 9,702,535 | B2 | 7/2017 | Dassanayake et al. |
| 9,901,039 | B1 | 2/2018 | Dellerson et al. |
| 9,903,576 | B2 | 2/2018 | Creasman et al. |
| 10,208,977 | B2 | 2/2019 | Bhide |
| 10,266,998 | B2 | 4/2019 | Apostolopoulos |
| 10,317,015 | B2 | 6/2019 | Joye |
| 10,326,247 | B2 | 6/2019 | Kohen |
| 10,326,274 | B2 | 6/2019 | Kempen |
| 10,845,046 | B2 | 11/2020 | Kohen |
| 11,196,216 | B2 | 12/2021 | Kohen |
| 11,460,184 | B2 | 10/2022 | Kohen |
| 2002/0060369 | A1 | 5/2002 | Akram |
| 2002/0064380 | A1 | 5/2002 | Reiker |
| 2002/0081107 | A1 | 6/2002 | Reiker |
| 2003/0012027 | A1 | 1/2003 | Hsu |
| 2003/0107891 | A1 | 6/2003 | Kohen |
| 2004/0192415 | A1 | 9/2004 | Luglio et al. |
| 2004/0223331 | A1 | 11/2004 | Kao |
| 2005/0148241 | A1 | 7/2005 | Kohen |
| 2006/0044789 | A1 | 3/2006 | Curtis |
| 2006/0141842 | A1 | 6/2006 | Sauer |
| 2006/0146527 | A1 | 7/2006 | Vanderschuit |

(56) References Cited

U.S. PATENT DOCUMENTS

2007/0105414 A1 5/2007 Kohen
2007/0167072 A1 7/2007 Kohen
2007/0258202 A1 11/2007 Cooley et al.
2008/0225531 A1 9/2008 Shiller
2009/0035970 A1 2/2009 Kohen
2009/0111322 A1 4/2009 Roland
2009/0129974 A1 5/2009 McEllen
2009/0135608 A1* 5/2009 Sell .................... F21V 19/0055 362/365
2009/0280673 A1* 11/2009 Kohen .................... F21V 23/06 439/529
2009/0280675 A1 11/2009 Zhou
2010/0020550 A1 1/2010 Kawashima
2010/0214775 A1 8/2010 Liang
2010/0295473 A1 11/2010 Chernel
2010/0296285 A1 11/2010 Chemel
2010/0301769 A1 12/2010 Chemel et al.
2011/0060701 A1 3/2011 Verfuerth et al.
2011/0134239 A1 6/2011 Vadai et al.
2012/0196471 A1 8/2012 Guo
2013/0040471 A1 2/2013 Gervais et al.
2013/0107536 A1 5/2013 Hiraoka
2014/0168944 A1 6/2014 Osada et al.
2014/0211487 A1 7/2014 Spiro
2014/0225731 A1 8/2014 Gouveia
2014/0268790 A1 9/2014 Chobot
2014/0301071 A1 10/2014 Jørgensen
2015/0009666 A1 1/2015 Keng et al.
2015/0009676 A1 1/2015 Danesh
2015/0044040 A1 2/2015 Oda et al.
2015/0085500 A1 3/2015 Cooper et al.
2016/0053952 A1 2/2016 Kuti et al.
2016/0069556 A1 3/2016 Li
2016/0074574 A1 3/2016 Welsch
2016/0131358 A1 5/2016 Spiro
2016/0255697 A1 9/2016 Bhide
2017/0105265 A1 4/2017 Sadwick
2017/0234319 A1 8/2017 Seccareccia
2017/0248148 A1 8/2017 Kohen
2018/0115131 A1* 4/2018 Kohen ............... H01R 13/6683
2018/0169279 A1 6/2018 Randers-Pehrson et al.
2019/0224350 A1 7/2019 Marry et al.
2019/0312396 A1 10/2019 Kohen
2020/0018469 A1* 1/2020 Kohen ................... G08B 25/10
2020/0056773 A1 2/2020 Kohen
2020/0144766 A1 5/2020 Kohen
2021/0296819 A1 9/2021 Kohen
2022/0190518 A1 6/2022 Kohen
2023/0233719 A1 7/2023 Kohen
2024/0088608 A1 3/2024 Kohen
2024/0243538 A1 7/2024 Kohen

FOREIGN PATENT DOCUMENTS

CN 1582518 A 2/2005
CN 1728475 A 2/2006
CN ZL 01 8 23877.7 11/2007
CN 10195268 A 12/2007
CN 101095268 A 12/2007
CN 102483213 A 5/2012
CN 202501418 U 10/2012
CN 102870307 A 1/2013
CN 104033399 A 9/2014
CN 203934061 U 11/2014
CN 204879746 U 12/2015
CN 105674223 A 6/2016
CN 107211515 A 9/2017
CN 115668663 A 1/2023
DE 19849101 A1 4/1999
DE 29923352 U1 8/2000
DE 20203467 U1 6/2002
EP 0704934 A2 4/1996
EP 1024559 A2 8/2000
EP 1456914 A1 9/2004
EP 1789984 A2 5/2007
EP 3295525 A1 5/2016
IL 126246 8/2001
JP 2003-016831 A 1/2003
JP 2003-16831 A 1/2003
JP 2004-320228 A 11/2004
JP 2008166071 A 7/2008
JP 2010129489 A 6/2010
JP 5331043 B2 10/2013
JP 53311043 B2 10/2013
JP 7291880 6/2023
RU 2009583 C1 3/1994
RU 2275720 C2 4/2006
RU 2011122686 10/2012
RU 2526853 8/2014
WO 00/16442 3/2000
WO 01/01047 A1 1/2001
WO 03/044906 A1 5/2003
WO 2005053100 A2 6/2005
WO 2005/074087 A1 8/2005
WO 2006031853 A2 3/2006
WO 2006/060772 A2 6/2006
WO 2010/064914 A1 6/2010
WO 2011/005526 A2 1/2011
WO 2011/020231 A1 2/2011
WO 2011/134709 A2 11/2011
WO 2013/159833 A1 10/2012
WO 2012/167320 A1 12/2012
WO 2016/009181 A1 1/2016
WO 2016054159 A1 4/2016
WO 2016/144795 A1 9/2016
WO 2016/183354 11/2016
WO 2016183354 A1 11/2016
WO 2018/204313 A1 5/2018
WO 2018/165646 9/2018
WO 2018/165646 A1 9/2018
WO 2018/165058 10/2018
WO 2018/195068 10/2018
WO 2018/195068 A1 10/2018
WO 2019/222259 A1 11/2019
WO 2020/039215 2/2020
WO 2020/039215 A1 2/2020
WO 2020/172390 A1 8/2020
WO 2021/174187 A1 9/2021
WO 2021/226018 A1 11/2021
WO 2022/150645 A1 7/2022
WO 2022/159853 A1 7/2022

OTHER PUBLICATIONS

Office Action issued by the European Patent Office dated Dec. 19, 2019 for Application No. 16 793 548.5-1201.
Response filed Jan. 17, 2019, in U.S. Appl. No. 15/573,606.
European Search Report for Application No. 16793548.5 dated Feb. 14, 2019.
Office Action for U.S. Appl. No. 16/491,321, dated Apr. 21, 2020.
International Search Report with Written Opinion dated Aug. 13, 2018 for PCT/US2018/030372.
Office Action dated Sep. 25, 2018 from Chinese Patent Office for Application No. 201580063483.2.
First Examination Report for Mexican Patent Application No. MX/a/2017/004137, dated Aug. 10, 2021.
International Search Report dated May 25, 2020, for PCT/US2020/019010 filed Feb. 20, 2020.
Written Opinion for PCT/US2020/019010 filed Feb. 20, 2020.
Office Action dated Oct. 28, 2022 for European Patent Application No. 18 764 255.8.
International Search Report, Written Opinion, International Preliminary Report on Patentability for PCT/US2004/039399 filed Nov. 22, 2004.
International Search Report, Written Opinion, International Preliminary Report on Patentability for PCT/US2005/032661 filed Sep. 14, 2005.
International Search Report, Written Opinion, International Preliminary Report on Patentability for PCT/US2005/043934 filed Dec. 2, 2005.

(56) References Cited

OTHER PUBLICATIONS

International Search Report, Written Opinion, International Preliminary Report on Patentability for PCT/US2015/53138 filed Sep. 30, 2015.
International Search Report and Written Opinion for PCT/US2016/32170 filed May 12, 2016.
European Search Report for EP05796234 dated Nov. 5, 2007 (realted to WO2006031853).
International Search Report for PCT/IL01/01078 filed Nov. 22, 2001.
International Preliminary Report on Patentability dated Sep. 10, 2019 with Written Opinion for PCT/US2018/021919, filed Mar. 12, 2018.
Chinese Search Report dated Feb. 18, 2019, for Patent Application No. 2016800404661.
First Office Action dated Feb. 27, 2019, from Chinese Patent Office for Patent Application No. 201680040466.1.
Communication dated Nov. 17, 2020 for European Patent Application No. 187636469.
Supplemental European Search Report dated Oct. 30, 2020 for European Patent Application No. 187636469.
For U.S. Appl. No. 15/515,664, filed Mar. 30, 2017: Responses filed Jan. 10, 2020, Sep. 10, 2020, Jul. 27, 2021 Notice of Allowance dated Aug. 23, 2021.
International Preliminary Report on Patentability dated Nov. 5, 2019 for International Application No. PCT/US2018/030372 filed May 1, 2018, 6 pages.
Written Opinion for International Application No. PCT/US2018/030372 filed May 1, 2018, 5 pages.
For Chinese Patent Application No. 201580063483.2 (national stage of PCT/US2015/053138): Third Office Action, dated Sep. 18, 2019 (with English translation) Response to Third Office Action, dated Dec. 2, 2019 (13 pages).
For Chinese Patent Application No. 201580063483.2 (national stage of PCT/US2015/053138): Response to First Office Action, dated Feb. 11, 2019 (9 pages) Response to Second Office Action, dated Aug. 26, 2019 (12 pages).
For Chinese Patent Application No. 2016800404661 (national stage of PCT/US2016/032170): Second Office Action, dated Dec. 2, 2019 (3 pages) Search Report, dated Nov. 24, 2019 (2 pages).
For Indian Patent Application No. 201717013438 (National Stage of PCT/US2015/053138): First Examination Report, dated Dec. 13, 2019 (6 pages).
English translation of Search Report from Chinese Patent Office for Application No. 201580063483.2 dated Sep. 11, 2018.
Office Action from Chinese Patent Office for Application No. 201580063483.2 dated Sep. 25, 2018 (with English translation).
For Russian Application No. 2021127449 filed Feb. 20, 2020: Russian Office Action dated May 16, 2023 Russian Search Report dated May 11, 2023.
Oficial Communication dated Aug. 22, 2023 for Inian Patnt Application No. 201937040845.
Office Action dated Jan. 26, 2022, for European Patent Application No. 18 763 646.9 (National Stage of PCT/US2018/020987) (6 pages).
Office Action for U.S. Appl. No. 15/515,664, dated Sep. 10, 2019.
International Preliminary Report on Patentability dated Sep. 10, 2019 for PCT/US2018/020987, filed Mar. 5, 2018.
International Search Report dated Jul. 6, 2018 for PCT/US2018/027956 filed Apr. 17, 2018.
Written Opinion Jul. 6, 2018 for PCT/US2018/027956 filed Apr. 17, 2018.
International Search Report dated May 17, 2018 for PCT/US2018/021919 filed Mar. 12, 2018.
Witten Opinion for PCT/US2018/021919 filed Mar. 12, 2018.
International Preliminary Report on Patentability dated Sep. 10, 2019 for PCT/US2018/021919.
International Search Report dated Aug. 13, 2018 for PCT/US2018/030372 filed May 1, 2018.
Written Opinion dated Aug. 13, 2018 for PCT/US2018/030372 filed May 1, 2018.
International Preliminary Report on Patentability dated Oct. 22, 2019 for PCT/US2018/027956.
Office Action dated Nov. 4, 2022 for European Patent Application No. 16 793 548.5.
International Preliminary Report on Patentability, dated Aug. 30, 2022, for PCT/US2021/020233.
Response to Office Action filed Nov. 3, 2022 for Indian Patent Application No. 201937046706.
Notice of Allowance dated Nov. 4, 2021 for Japanese Patent Application No. 2018-511347 (with English translation).
Notification of Publication dated Nov. 11, 2021 for Chinese Application No. 202080022559.8 (with English translation).
First Office Action dated Nov. 3, 2021 for Canadian Patent Application No. 2,963,134.
First Notification of Office Action dated Nov. 19, 2020, for Chinese Application No. 2018800333913, National Stage of PCT/US2018/027956 10 pages (with partial English translation).
First Office Action dated Dec. 23, 2020, for Israeli Patent Application No. 255549, National Stage of PCT/US2016/32170 7 pages.
Office Action dated Jan. 27, 2021, for U.S. Appl. No. 15/515,664, filed Mar. 30, 2017 67 pages.
Office Action dated Nov. 24, 2022 for Israeli Application No. 269246 and translation of Summary.
Office Action dated Jan. 5, 2023 for U.S. Appl. No. 17/432,155, filed Aug. 19, 2021.
Notice of Allowance dated Mar. 16, 2023 for Japanese Patent Application No. 2019-548272.
Korean Office Action dated Mar. 27, 2023 for Korean Patent Application No. 10-2017-7035630.
For Japanese Application No. 2019-548872: Notification of Reasons for Refusal dated Dec. 12, 2022.
Notification on Publication of Patent, dated Feb. 3, 2023, for Chinese Patent Application No. 202180031100.9.
For Brazilian Appl. No. BR112019023032-7 (national stage of PCT/US2018/030372): Technical and Search Report, dated Sep. 13, 2022 Response, dated Dec. 14, 2022.
For Brazilian Patent Application No. BR 11 2017 024224-9 (National Stage of PCT/US2016/032170): Amended claims filed May 7, 2019 Response filed Jun. 19, 2023.
For U.S. Appl. No. 16/605,994: Notice of Allowance dated Jun. 29, 2020.
First Examination Report dated Jun. 2, 2020 for Indian Patent No. 201717042509 filed Nov. 27, 2017.
IAEI, When continuity snaps, May-Jun. 2015.
IAEI, Supports reinforce our safety, Hanging Support Systems, Mar.-Apr. 2015.
International Search Report with Written Opinion dated Jul. 6, 2018 for PCT/US2018/027956.
Office Action dated Sep. 18, 2018 in U.S. Appl. No. 15/573,606.
Notice of Allowance dated Feb. 2, 2021 for U.S. Appl. No. 16/443,207.
International Preliminary Report on Patentability, dated Jul. 4, 2023 for PCT/US2022/011701.
Office Action dated Sep. 1, 2022 for Canadian Application No. 2,985,821.
Notice of Allowance dated Jul. 8, 2020 for U.S. Appl. No. 16/609,875.
Notification of Reasons for Refusal, Office Action dated Jan. 4, 2022, for Japanese Patent Appl. No. 2019-548872 (18 pages with English translation).
Final Office Action for U.S. Appl. No. 15/515,664, dated Mar. 10, 2020.
Office Action for U.S. Appl. No. 16/443,207, dated Mar. 11, 2020.
First Examination Report (FER) dated Feb. 13, 2022, and Response, dated Aug. 18, 2022, for Indian Application No. 201937049201 (17 pages).
International Preliminary Report on Patentability dated Nov. 14, 2017 for International Application No. PCT/US2016/032170 filed May 12, 2016.
International Search Report and Written Opinion for PCT/US2018/21919 filed Mar. 12, 2018.

(56) References Cited

OTHER PUBLICATIONS

International Search Report and Written Opinion for PCT/US2018/20987 filed Mar. 5, 2018.
European Search Report dated Jul. 3, 2018 for Application No. 15846948.6-1004/3212939.
Notice of Allowance dated Oct. 26, 2023 for U.S. Appl. No. 17/432,155.
Notice of Allowance dated May 31, 2022 for U.S. Appl. No. 17/240,102.
International Search Report dated Aug. 4, 2021 for PCT/US2021/030568, filed May 4, 2021.
Written Opinion dated Aug. 4, 2021 for PCT/US2021/030568, filed May 4, 2021.
International Search Report for PCT/IL99/00499 filed Sep. 14, 1999.
European Search Report for EP 01 27 4757 dated Mar. 28, 2006.
Australian Examiner's First Report on Patent Application AU 2002221000.
Indian First Examination Report dated Jun. 24, 2010 for Indian Application No. 1677/KOLNP/2006.
New Zealand Examination Report for NZ Patent Application No. 533697 dated May 9, 2007.
For Chinese Patent Application No. 01823877.7: Notice of Allowance dated Oct. 17, 2006 Second Office Action dated Apr. 6, 2007 First Office Action dated Jul. 4, 2006.
International Preliminary Report on Patentability and Written Opinion dated Nov. 8, 2022 for PCT/US2021/030568, filed May 4, 2021.
International Preliminary Report on Patentability dated Aug. 10, 2021 with Written Opinion for PCT/US2020/019010.
Notification of Reasons for Refusal Office Action dated Jan. 4, 2022 for Japanese Patent Application 2019-548272 (8 pages with English translation).
Office Action dated Jan. 28, 2022 for U.S. Appl. No. 17/240,102, filed Apr. 26, 2021.
Office Action dated Dec. 13, 2021 issued by the European Patent Office for Application No. 15 846 948.6.
Response to Office Action, dated Jan. 12, 2022, for Mexican Patent Appl. No. MX/A/2017/004137.
Office Action dated Dec. 20, 2023 for Canadian Patent Application No. 3,130,493.
Publication issued in the Official Gazette from Mexican Patent Application MX/a/2017/004137 dated Feb. 13, 2018, 3 pages.
First Office Action dated Sep. 2, 2020 for Chinese Application No. 201880030051.5 with translation of cover page (12 pages).
Response to First Examination Report, filed Sep. 4, 2020 for Indian Patent Application No. 201717013438, National Stage of PCT/US2015/053138.
Office Action dated Aug. 3, 2020, for European Patent Application No. 16793548.5 (Regional Stage of PCT/US2016/032170).
Office Action dated Feb. 1, 2024 for Israeli Patent Application No. 269246 (with English summary).
Extended Search Report dated Oct. 17, 2022 for Application No. 20768521.7.
Office Action for Canadian Patent Application No. 3,169,781 dated Feb. 5, 2024 (4 pages).
Response submitted for Canadian Patent Application No. 3,055,254, dated Mar. 21, 2024 (19 pages).
Written Opinion dated May 25, 2020 for PCT/US2020/019010 filed Feb. 20, 2020.
European Search Report dated Oct. 21, 2020 for EP 18764255.8.
For Brazilian Patent Application No. BR 11 2017 024224-9 (National Stage of PCT/US2016/032170): Response filed Oct. 14, 2020.
First Office Action dated Aug. 13, 2020 for Chinese Application No. 2018800295358.
Search Report dated Aug. 7, 2020 for Chinese Application No. 2018800295358.
International Search Report and Written Opinion dated Jun. 17, 2021, for PCT/US2021/020233.
First Office Action dated Oct. 23, 2020 for Chinese Application No. 2018800402400.
Technical Examination Report dated Mar. 13, 2023 for Brazilian Application No. BR112017024224-9.
International Search Report and Written Opinion dated Mar. 23, 2022 for PCT/US2022/011701 filed Jan. 7, 2022.
Search Report dated Feb. 20, 2024 for European Patent Application No. 21759787.1.
Office Action dated Feb. 6, 2024 for Japanese Patent Application No. 2021-548174.
Amendment and Statement of Argument filed with the Japanese Patent Office on Aug. 6, 2021 for Japanese Patent Application No. 2018-511347.
International Search Report dated Jul. 18, 2016 for International Application No. PCT/US2016/032170 filed May 12, 2016.
Written Opinion for for International Application No. PCT/US2016/032170 filed May 12, 2016.
Second Office Action for Chinese Patent Application No. 201580063483.2, dated Jun. 14, 2019 (with translation of 1 cover page).
International Search Report and Written Opinion for PCT/US2021/030568, filed May 4, 2021.
International Search Report and Written Opinion dated Apr. 8, 2022 for PCT/US2022/013598 filed Jan. 25, 2022.
For Mexican Patent Application No. MX/A/2017/014475 (national Stage of PCT/US2016/032170): Office Action dated Feb. 3, 2021, with English translation.
First Examination Report dated Mar. 25, 2021 for Indian Patent Application No. 201937040845.
Chinese Patent Application No. 2018800402400 (National Stage of PCT/US2018/030372): Second Office Action, dated Jun. 1, 2021.
Ex parte Quayle Office Action dated May 16, 2023, for U.S. Appl. No. 17/432,155.
Decision of Refusal (Office Action) dated Sep. 13, 2022 for Japanese Patent Application No. 2019-548272.
For Canadian Patent Application No. 3,055,254: Office Action dated Nov. 21, 2023.
For Canadian Patent Application No. 3,055,772: Office Action dated Nov. 15, 2023.
For Canadian Patent Application No. 3,062,157: Office Action dated Nov. 23, 2023.
For Canadian Patent Application 2,985,821: Office Action dated Jun. 16, 2023 Response filed Oct. 16, 2023.
International Preliminary Report on Patentability dated Jul. 20, 2023 for PCT/US2022/013598 filed Jan. 25, 2022.
For European Patent Application EP18764255.8: Office Action dated May 10, 2024.
Office Action dated Jun. 28, 2024 for Mexican Patent Application MX/a/2021/010076.
Notice of Allowance dated Mar. 14, 2024 for Canadian Patent Application No. 2,985,821.

* cited by examiner

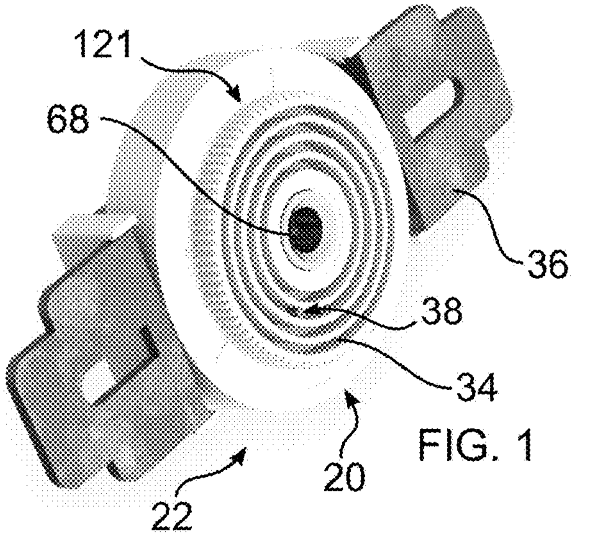
FIG. 1
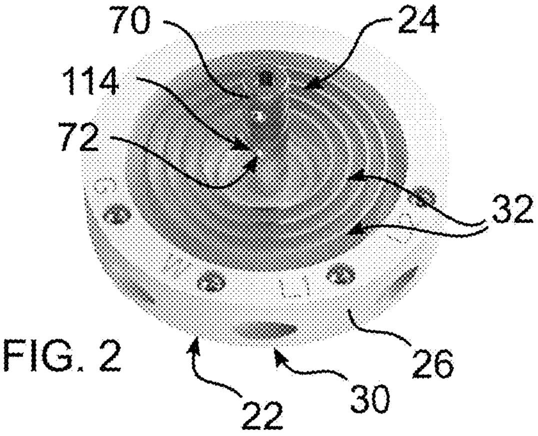
FIG. 2
FIG. 3
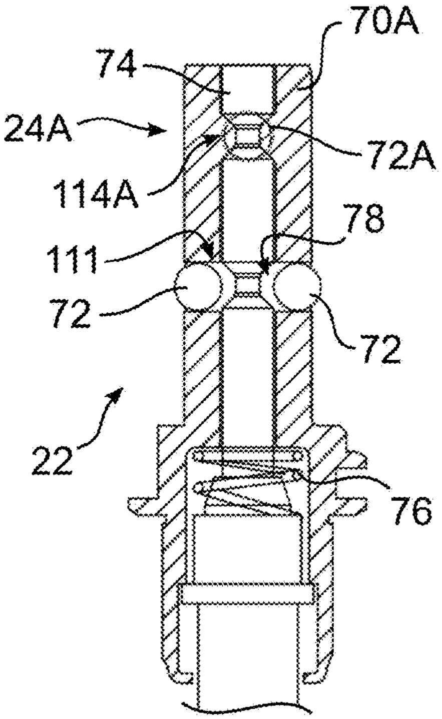
FIG. 4
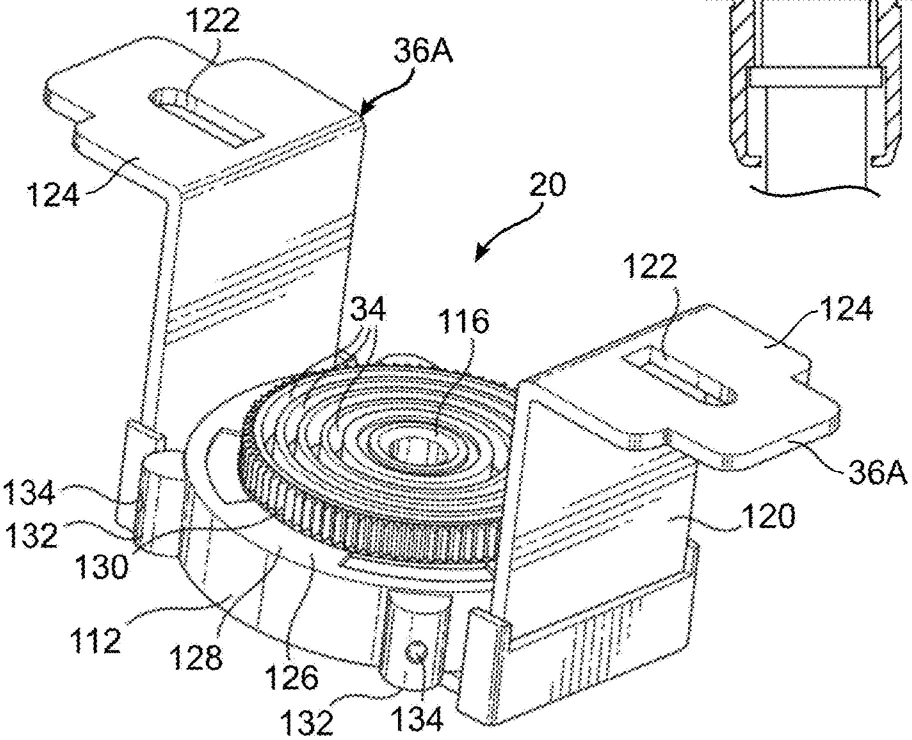

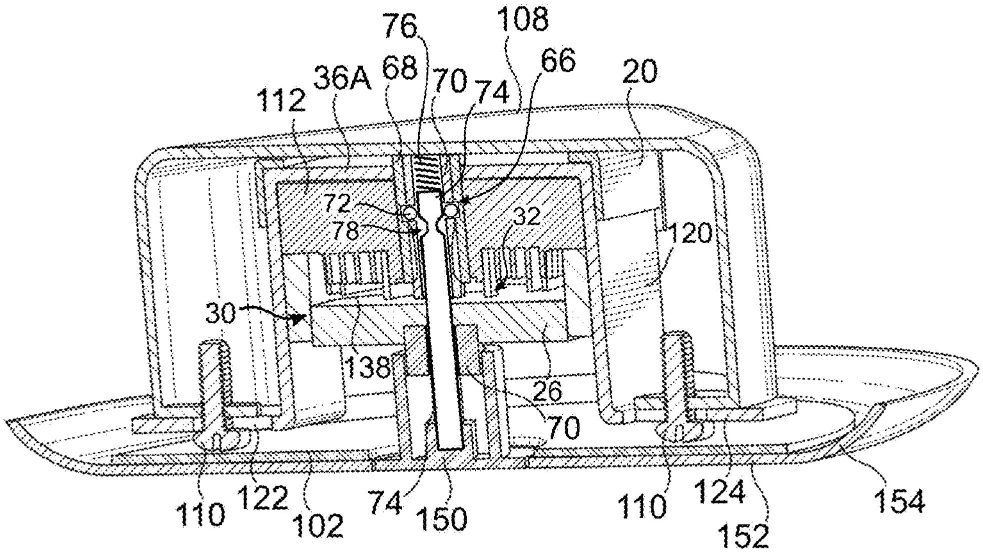
FIG. 5
FIG. 6
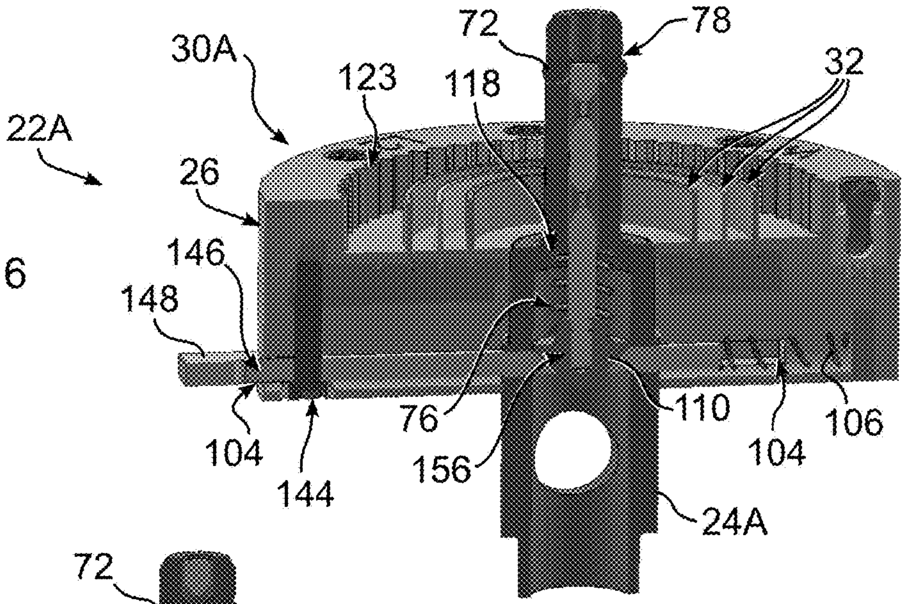
FIG. 7
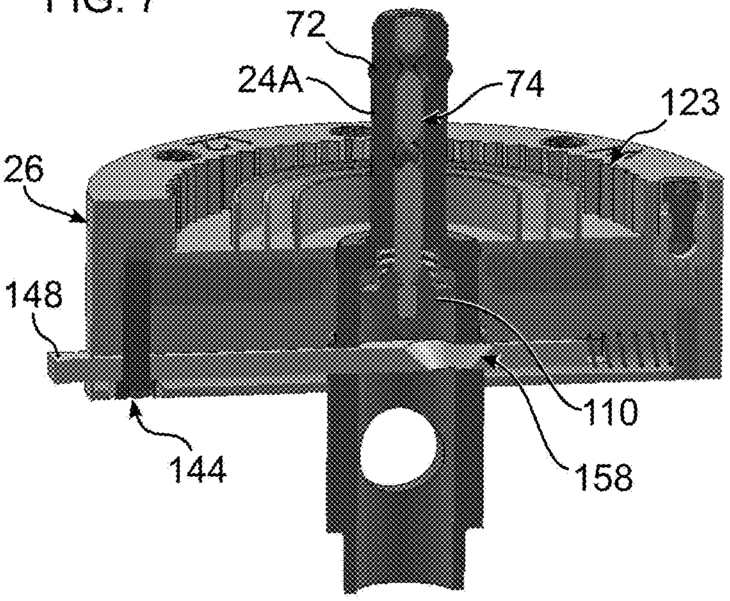

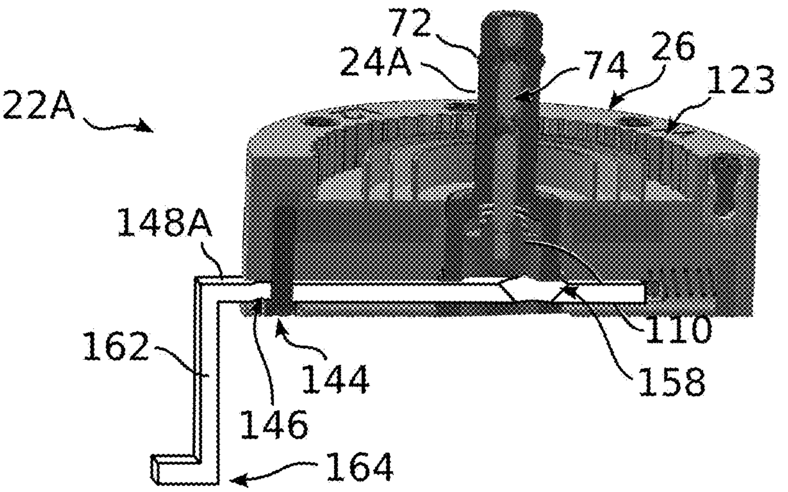
FIG. 8
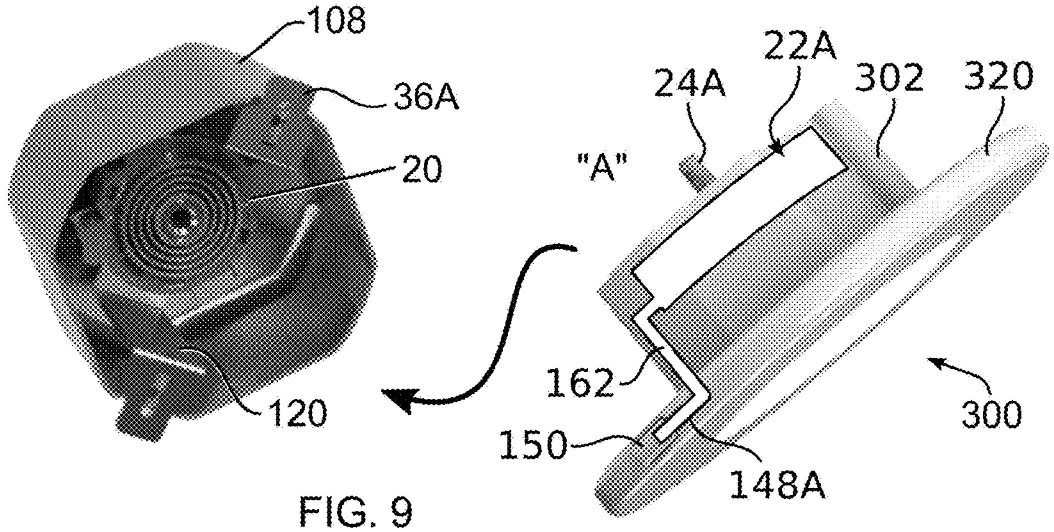
FIG. 9
FIG. 10
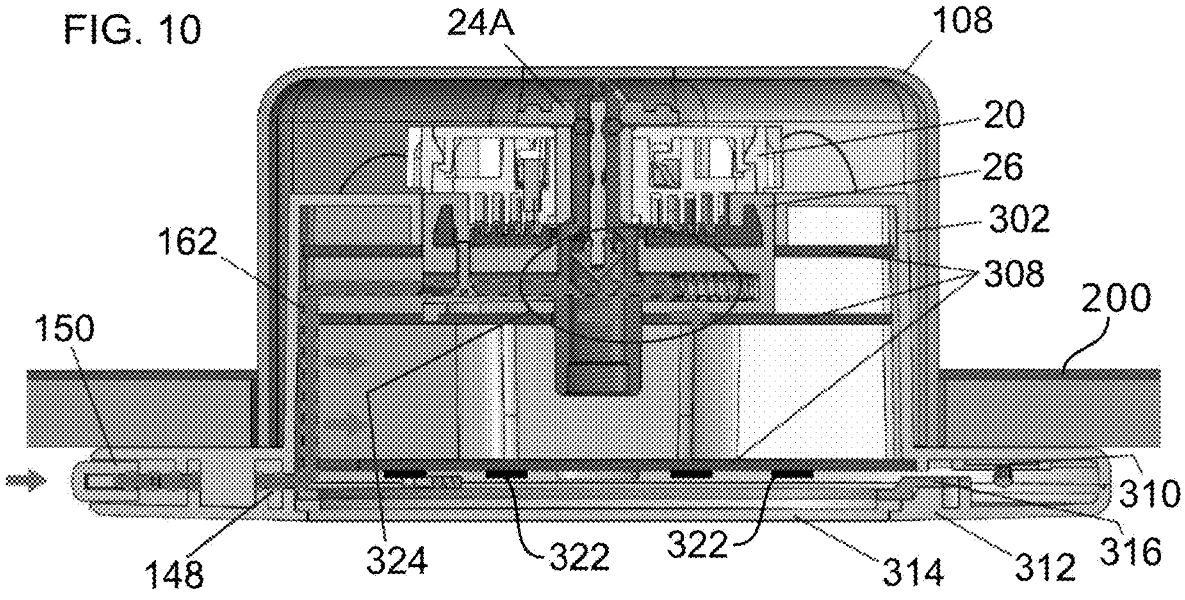

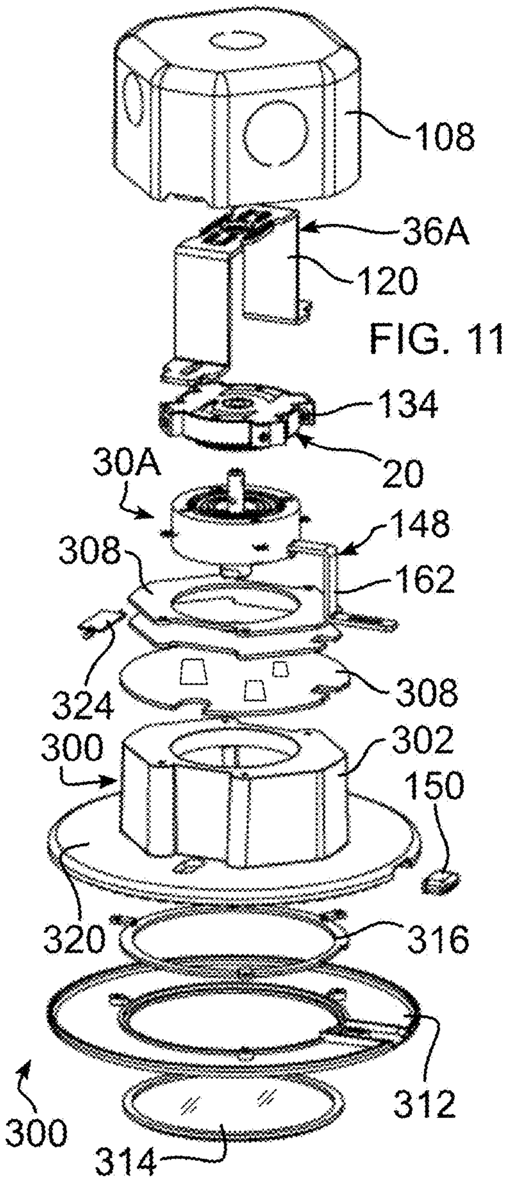
FIG. 11
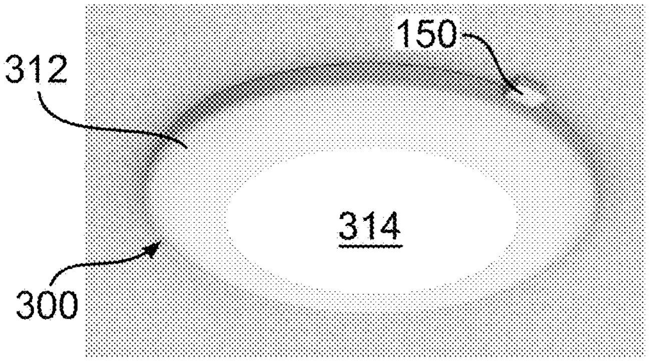
FIG. 12
FIG. 13
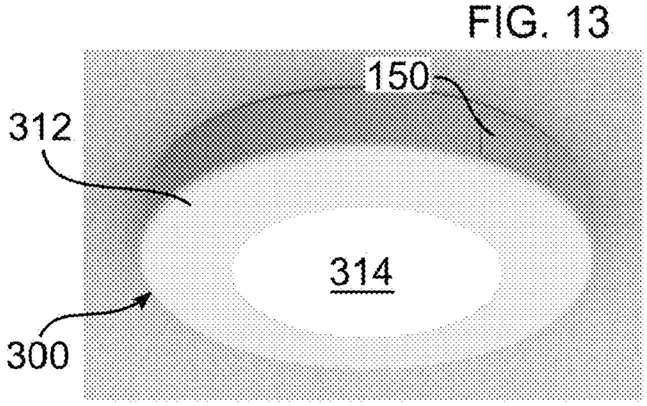
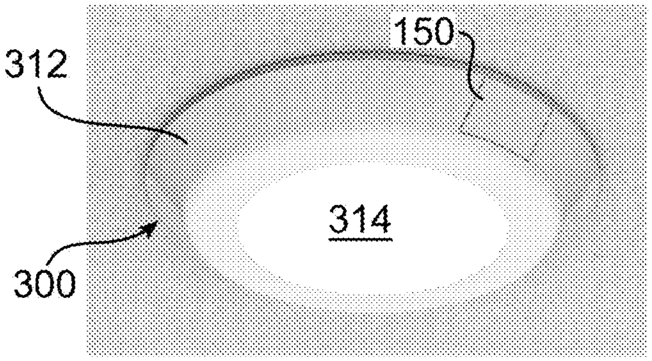
FIG. 14
FIG. 15
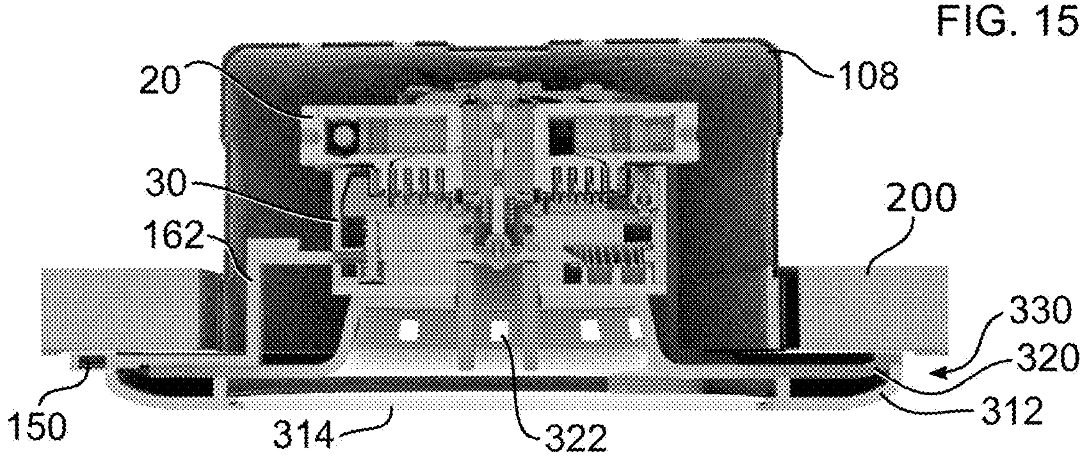

FIG. 16
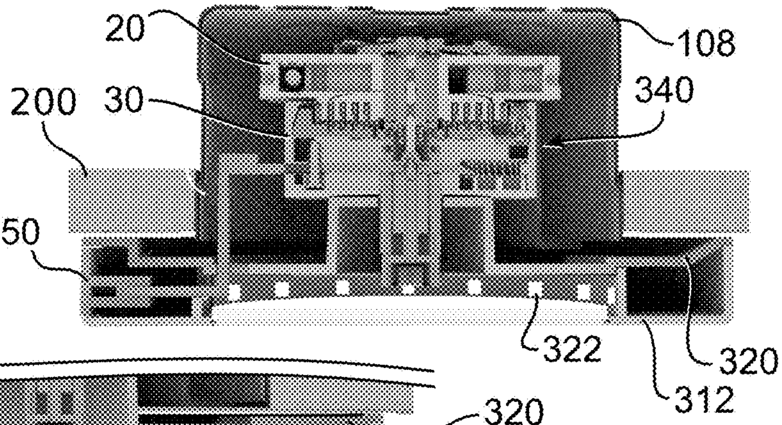
FIG. 17
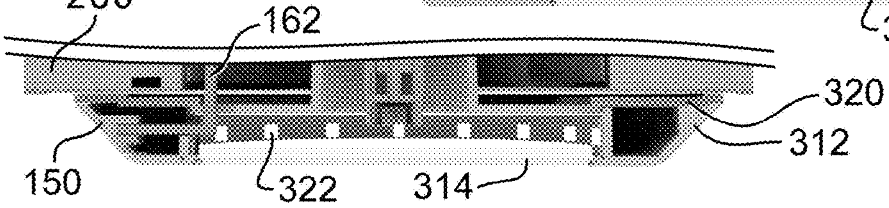
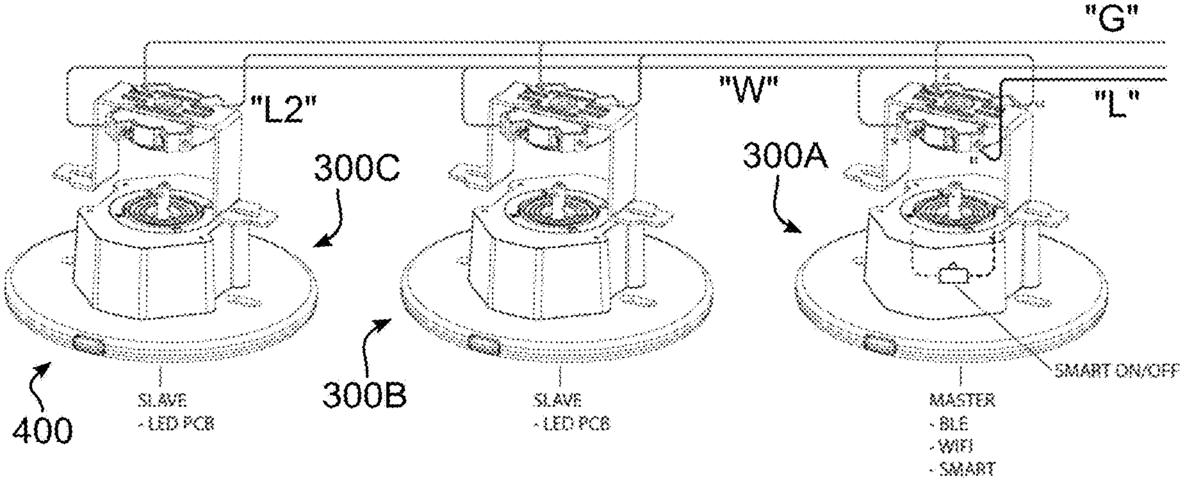
FIG. 18
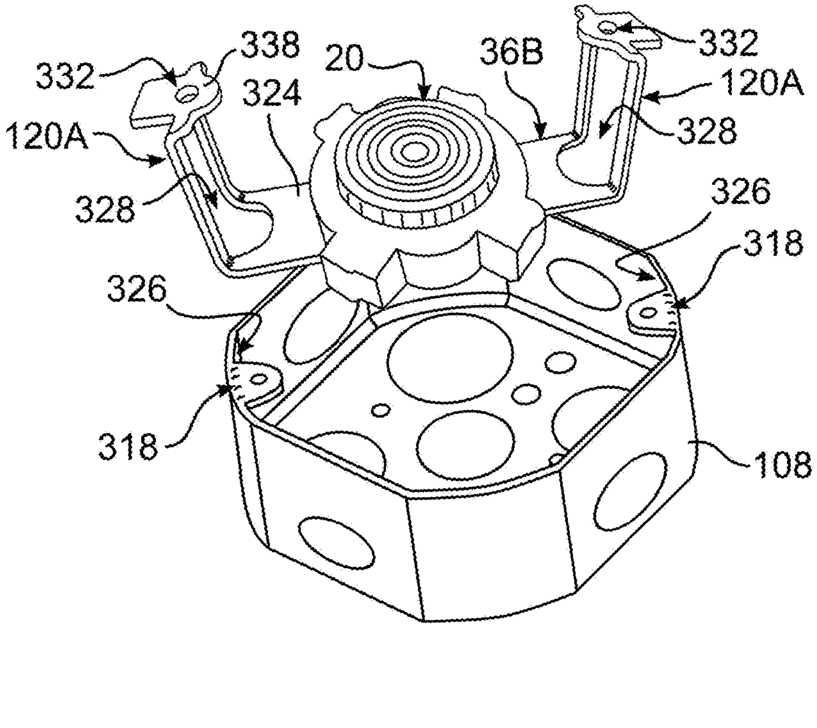
FIG. 19

RECESSING SMART QUICK CONNECT DEVICES

FIELD OF THE DISCLOSURE

The disclosure relates to electrical connectors and fixtures, and more particularly, to an electrical plug and socket combination allowing quick connection and mounting of electrical fixtures for recessed lighting. The disclosure also relates to a recessed lighting system that utilizes the electrical plug and socket combination.

RELATED PATENTS AND APPLICATIONS

This disclosure relates to PCT International Patent Application No. PCT/US20/19010 filed Feb. 20, 2020 (published as WO 2020/172390 A1); PCT International Patent Application No. PCT/US18/27956 filed Apr. 17, 2018 (published as WO 2018/195068 A1); PCT International Patent Application No. PCT/US18/21919 filed Mar. 12, 2018 (published as WO 2018/165646 A1); PCT International Patent Application No. PCT/US18/20987 filed Mar. 5, 2018 (published as WO 2018/165058 A1); PCT International Patent Application No. PCT/US2016/032170 filed May 12, 2016 (published as WO 2016/183354 A1); U.S. Pat. No. 7,462,066 filed Mar. 20, 2007; U.S. Pat. No. 7,192,303 filed Dec. 2, 2004; and U.S. Pat. No. 6,962,498 filed Dec. 12, 2001; and U.S. Patent Application Publication No. 2009/0280673 filed Dec. 2, 2005, the contents of all of which are hereby incorporated by reference herein, in their entirety.

BACKGROUND OF THE DISCLOSURE

Traditional techniques for installing electrical fixtures and appliances such as lighting fixtures and fans on walls or ceilings usually require the assistance of a qualified electrician, and the use of a variety of tools and specialized hardware. The procedure for installing or uninstalling such fixtures can also be relatively time consuming, even when performed by an experienced installer. In addition to the need for hand-wiring the necessary electrical connections between the fixture and electrical power supply wiring, the installer must make separate mechanical connections for supporting or suspending the fixture in place.

The patents identified above in the Related Patents and Applications Section disclose solutions to these and other problems. These related patents and applications disclose various embodiments of plug and socket combinations that permit quick connection of an electrical fixture or appliance at an electrical junction box on a wall or ceiling. The socket is secured on the wall or ceiling near electrical power supply wiring and includes female receptacles which receive male electrical prongs carried on the plug. The electrical fixture is secured to the plug. In addition to the quick electrical connection provided by this plug and socket combination, a mechanical connection between the plug and socket carries the mechanical load of the electrical fixture.

This disclosure sets forth improvements related to various embodiments of the plug and socket combinations in the related patents and applications for use when recessed lighting is desired. A recessed lighting system that utilizes the plug and socket combinations is also disclosed.

Recessed lighting is a versatile means of providing both ambient and task lighting to just about any area in home, office, or any desired space. Also known as pot lighting, can lighting, or downlights, these lights are mounted in the ceiling or wall (most often in a ceiling) rather than surface mounted on the wall or ceiling.

Recessed lighting includes two major components—the housing and the trim, both chosen (and oftentimes sold) separately. The housing is what's above the ceiling, and it contains all of the electrical components, such as the light source and the means to mount the fixture. The trim refers to what we see below the ceiling, such as the trim style or the parts that direct the light.

Besides functional differences in the wide variety of recessed lighting options commercially available, there are aesthetic ones too. If the look of a round, white light fixture, is not appealing for a given application, there are other choices available. Recessed lights with trim rings in different colors or metallic finishes are available. Square lights as well as different shapes and sizes are available if the round-style is too plain or conventional.

SUMMARY OF THE DISCLOSURE

In an embodiment of the disclosure, a device for connecting an electrical fixture with electrical power supply wiring located at or near an electrical junction box positioned such that a face of the electrical junction box is substantially flush with a surface, and for mounting the fixture on the electrical junction box, comprises a socket including a socket body having at least one internal cavity therein, the socket configured and dimensioned to be positioned in the electrical junction box and securable to the electrical junction box; an electrically conductive contact terminal disposed within the cavity for establishing an electrical connection between the electrical power supply wiring and the socket; a plug fixed to the fixture and insertable into the socket, the plug having at least one male connector electrically connected to the fixture and engageable with the contact terminal within the socket to establish a circuit between the electrical fixture and the electrical power wiring; and a releasable latch carried on the combination of the plug and the socket for releasably securing the plug to the socket, wherein the plug and socket are configured and dimensioned such that the fixture is positioned against the surface and at least partially inside the electrical junction box without being positioned within a recessed lighting housing.

In variations thereof, the fixture is a LED PCB light source; the LED PCB includes a cover; the cover includes a flange sized wider than a maximum width of an open end of the junction box into which the fixture is positioned; a body of the cover is transparent or translucent and the rim is opaque; the cover includes a lens, filter, or other optical element to create a lighting effect; the light source and cover both have a flat profile; at least one of the light source and cover has a domed profile; the socket includes a mounting strap attached to the socket body for securing the socket to the electrical junction box; the mounting strap is generally U-shaped with two legs; the length of the legs is at least twice the height of the socket body; the length of the legs is about the same as the height of the socket body; the electrical junction box includes a first series of vertically spaced holes and a second series of vertically spaced holes, with the first and second series of vertically spaced holes on facing surfaces of the electrical junction box; and/or the length of the legs is adjustable.

In another embodiment of the disclosure, a plug for coupling with a socket to form a device for connecting an electrical fixture with electrical power supply wiring located at or near an electrical junction box positioned such that a face of the electrical junction box is substantially flush with a surface, and for mounting the fixture on the electrical junction box, comprises at least one male connector electrically connected to the fixture and engageable with a contact terminal within the socket to establish a circuit between the electrical fixture and the electrical power wiring; and a releasable latch carried on the combination of the plug and the socket for releasably mounting the fixture on the support, wherein the plug and socket are configured and dimensioned such that the fixture is positioned against the surface without a recessed lighting housing.

In a further embodiment of the disclosure, a device positionable within an electrical junction box having an open face, the junction box recessed below a work surface, the open face open at the work surface, comprises a housing having an exterior periphery sized to be insertable at least partially within the electrical junction box; a plug: (a) having a body, (b) the body affixed to a distal end of the insertable exterior periphery of the housing, (c) having a plurality of concentric ring-shaped electrical connectors positioned upon the body to define an insertion face of the plug, (d) an elongate centrally disposed barrel defining a longitudinal axis and having at least one transverse channel, (e) a pin slidable within the barrel, the pin having at least one radial recess, (0 at least one ball disposed within the transverse channel and contactable by the pin, the pin slideable to alternately position the ball adjacent a radial recess and not adjacent a radial recess; a lever: (i) slideable within the plug along an axis transverse to the longitudinal axis of the barrel, (ii) positioned at an end of the pin, (iii) having a cam surface contactable with the end of the pin to alternately push the pin to position a radial recess adjacent to a ball and to a position where the radial recess is not adjacent to a ball to thereby push the ball along the transverse channel; (iv) extending outside of the plug body to a distance away from the body, and turning to further extend away from the plug in a direction away from the insertion face of the plug, (v) the lever pushable to drive the cam surface against the end of the pin, (vi) the lever extending beyond the surface of the work so that it may be pushable when the housing is inserted into the junction box.

In a variation thereof, the system further includes an electrical socket including a socket body having an internal cavity which contains one or more concentric ring-shaped openings positioned upon a plug insertion face, the openings mateable with the ring shaped electrical contactors of the plug, each opening associated with an electrical contact contactable with a ring shaped electrical contactor, the socket body defining a plug insertion face; and a bracket including an elongate base to which the socket is affixed, and two extension arms extending from opposite ends of the base and away from the plug insertion face, the extension arms connectable to the junction box to position the socket at a position below the opening of the junction box to thereby mate with the plug of the device.

In other variations thereof, the device further includes a flange connected to the housing and sized to have a width larger than the width of the open face of the junction box; the device further includes at least one electronic circuit board; and/or the housing further includes at least one light emitting device.

In another embodiment of the disclosure, a socket for a recessed lighting housing to mechanically and electrically couple an electrical fixture fixed to a plug, comprises an extender having an Edison type base on a first end and a socket body on a second end, the Edison type base threadably connectable to threading of housing to mechanically and electrical couple the socket to the housing; a socket body on a second end of the extender, the socket body having at least one internal cavity therein and an electrically conductive contact terminal disposed within the cavity for establishing an electrical connection between the housing and the socket; and a releasable latch carried on the combination of the plug and the socket for releasably securing the plug to the socket.

In variations thereof, the extender has a fixed length, or the extender has an adjustable length.

BRIEF DESCRIPTION OF THE DRAWINGS

A more complete understanding of the disclosure, and the attendant advantages and features thereof, will be more readily understood by reference to the following detailed description when considered in conjunction with the accompanying drawings, in which:

FIG. 1 depicts a conventional socket that can be used or modified to use as part of the quick connect device according to the disclosure;

FIG. 2 depicts a conventional plug that includes features that are common to the plug of the quick connect device according to the disclosure;

FIG. 3 depicts an embodiment of a plug spindle which includes 90-degree offset balls and can be incorporated into the plug of the quick connect device according to the disclosure;

FIG. 4 is a perspective view of a socket of FIG. 1 attached to a bracket of the disclosure, the assembly insertable within an electrical junction box;

FIG. 5 is a perspective cross section through the center of the assembly of FIG. 4 installed within an electrical junction box;

FIG. 6 is a perspective cross-section of a plug having features of the plug of FIG. 2, and modified to include a release lever which moves a pin to enable release of the plug from a socket having features of the socket of FIG. 1, the pin in a position to lock the plug to the socket;

FIG. 7 depicts the plug of FIG. 6, the moved by the lever to a position to enable release of the plug from the socket;

FIG. 8 depicts the plug of FIG. 6, modified in accordance with the disclosure to include an extension arm attached to the release lever and extending away from the plug;

FIG. 9 diagrammatically depicts the plug of FIG. 8 within a fixture of the disclosure, a body of the fixture insertable into a depicted junction box to which a socket of FIG. 4 has been affixed in accordance with the disclosure;

FIG. 10 is a cross-section through the center of an assembly as depicted in FIG. 9;

FIG. 11 is an exploded perspective view of the assembly of FIG. 9;

FIGS. 12-14 are perspective views of the assembly of FIG. 9, mounted with a ceiling, where only replaceable fixture covers in accordance with the disclosure are visible, as well as an end of the release lever which can be pushed to release the fixture, FIGS. 12-14 depicting shallow convex, increased height convex, and angled cover styles, respectively;

FIG. 15 depicts a cross-section of an assembly of the disclosure similar to that of FIG. 9, further depicting LED lights, and illustrating replaceable covers of the disclosure, and particularly the shallow cover of FIG. 12;

FIG. 16 depicts a cross-section of an assembly of the disclosure similar to that of FIG. 9, further depicting a central release lever in addition to the extended release lever of FIG. 9, and depicting the increased height convex cover of FIG. 13;

FIG. 17 depicts the device of FIG. 16, and depicting the angled cover of FIG. 14;

FIG. 18 depicts a system of a plurality of fixtures of the disclosure, including a lead fixture which controls electrically connected ancillary fixtures;

FIG. 19 depict an alternative socket mounting bracket including removed portions for maximizing space with a junction box;

DETAILED DESCRIPTION OF THE DISCLOSURE

Figure 20:
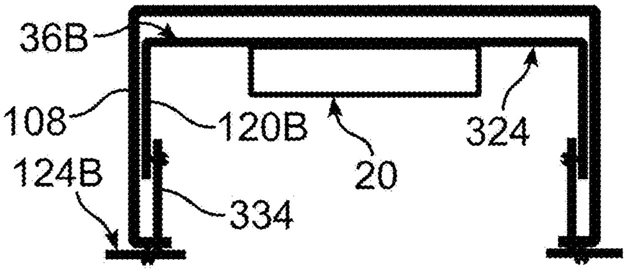
FIG. 20 depicts a diagrammatic view of an alternative socket mounting bracket of the disclosure with adjustable two-part extension arms.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities can be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, or C; A and B; A and C; B and C; and A, B, and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the specification, skilled artisans will appreciate that certain features are, for clarity, described herein in the context of separate embodiments, can also be provided in combination in a single embodiment. Conversely, various features that are, for brevity, described in the context of a single embodiment, can also be provided separately or in any subcombination. Further, references to values stated in ranges include each and every value within that range.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

The discussion herein is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

Headings are provided for the convenience of the reader and are not intended to be limiting in any way.

The disclosure herein relates to the inventor's prior work, such as that set forth above in the documents identified in the Related Patents and Applications section, the contents of each of which are herein incorporated in their entirety by reference. In this regard, the plug and/or socket can include a sensing unit for at least one of wirelessly communicating a sensed condition and wirelessly receiving a signal as disclosed in PCT International Patent Application No. PCT/US2016/032170 filed May 12, 2016 and PCT International Patent Application No. PCT/US2018/020987 filed Mar. 5, 2018.

A "quick connect device" for installing electrical fixtures comprises the combination of a plug and mating socket, which is also known as a receptacle. The plug and mating socket of the device function to both establish an electrical connection between an electrical fixture and electrical supply wiring, and mechanically support the fixture on a surface or base, typically a wall, ceiling or floor surface. As used herein, the term "fixture" or "electrical fixture" means any fixture or appliance such as a lighting fixture, ceiling fan, television camera, security device or any other device which is powered by electricity supplied by electrical wiring, and which requires a mechanical connection to support or suspend the fixture. The plug is fixedly secured to an electrical fixture, while the socket is secured to either the surface (e.g., wall, ceiling or floor) on which the fixture is to be mounted, or to an electrical junction box. The structure, function, and operation of the plug and mating socket, generally, have already been detailed in, for example, the patents and application incorporated by reference herein.

Referring for example to the incorporated reference published as WO 2016/183354 A1 and WO 2018/165058 A1 (collectively 'the smart quick connect publications'), a quick connect device 22 for installing electrical fixtures comprises the combination of a plug 30 and mating socket 20. A detailed description of the structure and function of a socket 20, plug 30, and spindle assembly 24 is provided in the smart quick connect publications and other incorporated references. As in the smart quick connect publications, one or more sensors or other receiving/input or transmitting/output electronic or electrical devices 48, 50 (hereinafter 'sensors') can be associated with either plug 30 or socket 20. Socket 20 is known, as disclosed in the incorporated references, and as codified in the U.S. National Electric Code.

As detailed in the smart quick connect publications, and as detailed further elsewhere herein, devices of the disclosure can be provided with or attached to electronic sensors and/or processors, transmitters and/or receivers, and other electronic circuits, and which may be deemed 'smart' devices, or device of the disclosure may be associated with power consuming devices such as lights or fans, which may or may not include 'smart' electronics or components, or other electronics which are unrelated to the operation of the device itself.

Plug and Socket

An example conventional socket 20 is shown in FIG. 1. Conventional socket 20 can be used as the socket that forms part of the quick connect device according to the disclosure. FIG. 2 shows a conventional plug 30 that has features that are common to the plug that forms part of the quick connect device according to the disclosure. An alternative spindle assembly 24A is shown in FIG. 3. Socket 20, plug 30, and alternative spindle assembly 24A are now discussed to help describe some of the structure, function, and operation of the quick connect device according to the disclosure.

In particular, socket 20 of a conventional quick connect device 22 for installing electrical fixtures receives a plug 30, thereby forming an electrical connection between socket 20 and plug 30. In FIG. 1, socket 20 can be attached to a bracket 36 or other structure which is configured for mounting to a standard electrical box or other structural member of a building. As can be seen in FIGS. 2-5 and 7, a spindle assembly 24 is used to releasably mechanically connect plug 30 to socket 20. Male connector rings 32 are provided within a cavity 138 of plug 30, and can be supported by being integrally molded within body 26 of plug 30, if body 26 is molded from a non-conductive material. Rings 32 have sufficient radial spacing therebetween to electrically insulate them from each other. The diameters and spacing of the male connector rings are such that they are alignable with and receivable within corresponding female recesses 34 in the socket 20, to make electrical contact with mating conductors socket conductor 38 within socket 20. As detailed in the patent publications incorporated by reference, this alignment is used to electrically connect the plug 30 to the socket 20, thereby establishing an electrical connection between an electrical fixture and electrical supply wiring, and mechanically supporting the fixture on a surface or base, typically a wall, ceiling, or floor surface.

The number of rings can correspond to the number of electrical connections needed. For example, an electrical power connection can include a source or 'hot' conductor which is circuit breaker protected, a return or 'neutral' conductor, and a safety or 'ground' conductor. Additional conductors can be added for a 3-way switch leg or traveler conductor, a second 'hot' conductor for a 2-phase connection, and any number of signal conductors for analog or digital data.

FIG. 3 shows an alternative spindle 24A, in which one or more balls 72 are radially oriented 90 degrees with respect to other balls 72 spaced axially at a distance along spindle 24A. Common to both embodiments of FIGS. 2 and 3, a spring 76 (shown in FIG. 3) biases a latch pin 74, which slides within a barrel 70/70A to position recesses 78 of latch pin 74 away from balls 72 to maintain balls 72 trapped within and extending from apertures 114 within barrel 70, thereby preventing withdrawal of barrel 70 from barrel 68 of socket 20 due to interference between balls 72 and a mating groove or ledge 66 (FIG. 7) within barrel 68 affixed to socket 20. When latch pin 74 is pushed axially against the bias of spring 76, latch pin 74 is moved to align recesses 78 with balls 72, thereby allowing balls 72 to move out of interference with barrel 68, enabling withdrawal of barrel 70 from barrel 68, and thereby removal of plug 30 from socket 20.

It should be understood that the choice of using a socket 20 for a base reflects that electrical conductors carrying potentially dangerous high voltage electrical signals should be recessed and not touchable by people. However, where exclusively low voltage/low power signals are being used, the locations of plug and socket can be reversed or arbitrarily chosen.

Recessed Plug and Socket

With reference to FIGS. 4-5, socket 20 comprises a substantially cylindrically shaped body 112 formed of non-conductive material such as phenolic resin. Concentric, ring shaped, female recesses or slots 34 are formed in one face of socket 20 and are configured to matingly receive male connector rings 32 of plug 30 to establish electrical connections between plug 30 and socket 20. Socket 20 includes a bushing 116 affixed to socket 20 which defines a throughhole through which spindle 24 may pass. In the illustrated embodiment, bushing 116 passes through and is fixedly secured to an elongate mounting bracket 36A as by welding, riveting, threaded fastener, or other attachment. Bushing 116 and bracket 36A could alternatively be of unitary construction, formed of a single piece of high strength material, such as metal, as by casting, machining or other metal working processes.

Bracket 36A is generally U-shaped with an extension arm 120 having a length selected so that an electrical device incorporating device 20 has the look and effect of a recessed electrical fixture, such as recessed lighting for example, when installed in an electrical junction box 108. While dependent upon the length of the portion of the electrical device that must be recessed or hidden, arm 120 can have a length at least twice the height of socket body 112, for example. Bracket 36A is provided with an outwardly extending mounting flange 124 positioned at each end of arm 120 extending away from each other, each flange 124 including an aperture 122 through which bracket 36A can be attached, for example as by screws 110, to junction box 108. In this manner, device 20 can be affixed to junction box 108. Thus, length 120 and the U-shaped configuration of bracket 36A enables socket 20 to be recessed within the junction box, as depicted in FIG. 5. By selecting a particular length 120, a height within a particular style junction box can be predetermined.

As detailed further in the incorporated references, extension arms 120 can have an adjustable length. In one embodiment, arm 120 is provided in two mutually attachable lengths which can overlap to a greater or lesser extent. The two attachable lengths can be mutually affixed, for example with threaded fasteners. More particularly, one attachable length can have a plurality of spaced apart holes, and the other attachable length can include at least one hole through which a fastener can be extended to pass through a selected one of the spaced apart holes to thereby determine a length of the arm 120 comprising the two attachable lengths.

Socket body 112 can be provided with a circumferential notch 126 defining an annular face 128 that is intended to engage a corresponding face on plug 30 and acts as a stop to limit the entry of plug 30 into socket 20. Plug 30 and socket 20 are each provided with a plurality of teeth 130 on a periphery of socket 20 and a mating periphery of plug 30. Teeth 130 can alternatively be provided on face 128 and a mating face of plug 30. Teeth 130 of plug 30 and socket 20 inter-engage or mesh when plug 30 and socket 20 are mated to prevent rotating relative to each other. Prior to the teeth 130 of the plug 104 and socket 106 engaging, plug 104 and socket 106 are free to rotate relative to each other, so that a desired radial alignment between socket 20 and an electrical device associated with plug 30 can be selected.

Socket body 112 includes connection tabs 132, with each of tab 132 having an electrical contact/connector 134 for receiving and affixing an electrical supply wire, for example by screw terminal, quick release connection, or other suitable electrical connection. The exact size of connector 134 is determined based upon the maximum gauge of electrical wiring required for the anticipated application. A bare stripped end of the electrical supply wire is connected to socket 20 by inserting the wire end into one of the connectors 134. Each of tab 132 is electrically connected to a corresponding one of conductor 38 as disclosed in detail in the patent documents incorporated by reference. Although tabs 132 are shown on the side of body 112, in some applications, it may be more convenient or possible to feed the electrical supply wires into the back face of socket body 112, which corresponds to an upper or top surface when the junction box is mounted in a ceiling. In this case, the electrical supply wires may be positioned through access openings located on the top of socket body 112, where they likewise establish electrical connection to socket conductors 38.

In FIG. 5, a fixture 102 is affixed to plug 30, shown in FIG. 5 as a blank cover. When fixture 102 is a blank cover, it provides the advantage of covering socket 20, and provides a finished appearance when an electrical fixture 102 may not be needed or has not yet been selected. When fixture 102 is a blank cover, connector rings 32 can be absent, or can be a non-conductive material to reduce cost. To enable release of fixture 102, a push button 150 is movably retained within fixture 102 and contacts or is connected to latch pin 74, whereby pin 74 can be pushed to release spindle 24 as described. Push button 150 can be pressed with a finger or a tool to release blank cover 102. When fixture 102 is lighting or other electrical fixture, it can be released in a like manner if button 150 is accessible. Where the electrical fixture 102 covers the area of push button 150, a rod or other structure may be connected to latch pin 74 and extend through the fixture to where it may be depressed to release the fixture.

Fixture 102 may be secured to plug 30 in any of a variety of ways. For example, fixture 102 can be fixedly attached to a lower section of barrel 70. As shown, fixture 102 includes a cover 152, which is attached to barrel 70, and fixture 102 is attached to cover 152. The weight of fixture 102 is transmitted through barrel 144, retaining balls 72, and socket barrel 68 to mounting strap 36A, which in turn is secured to electrical junction box 108.

Fixture 102 can include a cover 152 which can be provided with a rim 154 to create the look of a trim found in a traditional recessed lighting fixture. Cover 152 can be clear plastic or glass to allow the illumination of light from a lighting fixture 102 to be transmitted. Cover 152 can include a lens, filter, or other optical element to create a desired lighting effect.

Side Release Plug and Socket

Referring now, in particular, to FIGS. 6-7, a plug 30A includes a body 26 which slidingly receives a release lever 148 in a channel 104. In the embodiment shown, body 26 includes circumferential teeth 123 which mate with complementary teeth 130 on socket 20, to enable setting and mating a specific radial alignment of socket 20 and plug 100 when plug 100 is inserted into socket 20.

In FIG. 6, lever 148 is in a first position, wherein cam follower 110, urged by a resilient member, has moved along cam surface 158 to increase a contact area between cam follower 110 and cam surface 158. In this position, latch pin 74 is in a lower position, as shown in FIG. 2, whereupon latch pin 74 no longer positions recesses 78 adjacent to balls 72, locking balls 72 into engagement with socket barrel 68. Latch pin 74 is urged into the first position, in this embodiment, by pin spring 76, which is positioned between follower 110 and a ledge 118 within spindle 24. Spring 76 can alternatively be positioned as shown in FIG. 5. A separate resilient member, in this embodiment return spring 106, further biases lever 148 into the first position.

Referring now to FIG. 7, lever 148 has been pushed within channel 104, against the biasing force of return spring 106, in the example of FIG. 7 to the right, into a second position representing an unlocked/release position. As lever 148 is moved towards the second position, cam follower 110 slides against the cam surface 158 which pushes cam follower 110 upwards as viewed in FIG. 7, in a direction away from lever 148, compressing pin spring 76. Accordingly, latch pin 74 moves upwards, aligning recesses 78 with balls 72, enabling balls 72 to move out of engagement with barrel 68, whereupon plug 30 is mechanically disengageable with socket 20. In FIG. 7, follower 110 has been moved completely out of engagement with cam surface 158. However, follower 110 and recesses 78 can be positioned so that follower 110 can remain partially engaged with surface 158 to align balls 72 and recesses 78 for unlocking and releasing plug 100 and socket 20.

Cam follower 110 can be formed as a separate part attached to latch pin 74, as shown in the figures, or can be integrally formed at an end of latch pin 74. Cam follower 110 can be fabricated from any sufficiently durable and rigid material, such as metal, plastic, a synthetic or composite material, or a natural material, such as wood. When attached as a separate part, follower can be attached by an interference fit, and/or with the use of adhesive, threading, brazing, soldering, or any other method which ensures a durable attachment. As can be seen in the figures, lever 148 limits a range of motion of follower 110, and thus limits a position of latch pin 74 between the first (locked) or second (unlocked/release) positions.

Lever 148 is slideably confined within channel 104 and is prevented from being pushed out of channel 104, due to the force of spring 106 or gravity, by a retention post 144 which passes through a retention slot 146 formed within lever 148. A free end of lever 148 can be provided with a release button 150, such as is provided for in the embodiment of FIG. 5.

In the embodiment shown, cam surface 158 and follower 110 are conical in profile, however cam surface 158 and follower 110 surfaces do not need to be circumferential but could be flat, v-shaped, or other shape, and can be positioned only along a direction of releasing movement of lever 102 as described herein. Herein, release lever 148, channel 104, cam surface 158, cam follower 110, and related structure, comprise a lever release assembly.

Side Release Recessed Plug and Socket

Turning now to FIGS. 8-9, it may be seen that lever 148A is similar to lever 148 of FIGS. 6-7, but includes a lever extension 162 which positions a distal end 164 of lever 148A at a distance from plug body 26. In this manner, plug 30A can be recessed within an electrical junction box 108, while enabling operation of lever 148A to release plug 30A from socket 30.

More particularly, with reference to FIG. 9, at right, plug 30A is depicted diagrammatically, as mounted within electrical fixture 300. A button 150 is visible upon a peripheral flange 164. Further in FIG. 9, at left is the embodiment of socket 30 of FIGS. 4-5. Electrical fixture 300 has a body housing 302 that is sized to fit within junction box 108, wherein flange 320 remains outside of and overlying junction box 108. In this manner, plug 30A can be mated to socket 30, while button 150 remains pressable to push lever 148A to release fixture 300.

While fixture 300 is depicted as a lighting fixture, it should be apparent that any type of fixture which can be at least partially recessed within junction box 108 can incorporate or be formed to extend from plug 30A.

Side Release Recessed Smart Plug and Socket

It is apparent from the diagrammatic view of plug 30A in FIG. 9 that body 202 provides more internal space than is required for housing plug 30A. With reference to FIG. 10, one embodiment of fixture 300 is presented in cross-section, wherein a portion of the additional internal space is used for housing electronics.

In FIGS. 10-11, junction box 108 is mounted within a ceiling 200. When for example, fixture 300 is a recessed lighting fixture, the fixture is typically mounted to be flush or almost flush with the ceiling and covers the front of junction box 108 so that no portion of junction box 108 is visible. As detailed elsewhere herein, socket 20 can be mounted at a distance from the opening of junction box 108, to provide space for a fixture housing 302. This further facilitates connection to electrical wires and positions the electrical wires away from and out of interference with fixture housing 302. Encircled area 324 indicates a location of the cam follower 110 and cam surface 158, positioned at a distance from cover 312.

Electrical fixture 300 is depicted to include a light source, in this embodiment LEDs 322. Although lighting source 322 is shown as LEDs on an electronic circuit board 308, the disclosure contemplates the use of any suitable light emitting device. Electronic circuit boards herein are depicted as printed circuit boards (PCBs), however any type of electronic board can be used within the disclosure. Where there are multiple circuit boards, they are connected by suitable electrical connectors (not shown). Likewise, power from the junction box is connected between plug 30A and boards 308 as needed, by wires connected between electrical connector 134 and electronic board 308, or an integrated conductive pathway therebetween which can be embedded in the manner of rings 32, for example. A lens 314 protects LEDs 322, and can provide a light filtering function, a light focusing function, or other light adaptation function, which can create a desired lighting effect. If needed, a lens bracket 316 can secure lens 314 to a cover 312 and/or housing 302. Boards 308 can be affixed to housing 302 or cover 312 which is affixed to plug 30/30A or can be affixed directly to plug 22/30A, for example to plug body 26 or to spindle assembly 24/24A.

In FIG. 10, three circuit boards 308 are depicted, although any number of boards 308 can be provided. A lowermost board as viewed supports and powers LEDs 322. Any of the boards can include any of a variety of electronic devices as disclosed in the incorporated references. Examples include devices or supporting electronics for devices which can include any or all of lights; transmitters and/or receivers for any of radio frequency, WiFi, Bluetooth, near field exchange, inductance charging, cellular, low power wide area network (LPWAN), LTE, LTE-M, NarrowBand IoT (NB-IoT (Internet of Things)), LoRa, Zigbee, Z-Wave, or other known or hereafter developed signal transmission; sensors for temperature, humidity, smoke, motion, heat signature, ultrasound, sound, speaker, microphone, propane, carbon monoxide (CO) or other gas; security device such as security camera (with or without motion detection), glass-breakage, wired or wireless intrusion detection loops (with or without self-monitoring), pressure sensor, or strain gauge. It should be understood that this is necessarily a limited list, as other types of electronic devices can be incorporated into fixtures of the disclosure. In FIG. 10, a signal transmitter/receiver 310 is depicted, near cover 312, as an illustrative example. A battery 324 (FIG. 11) can be provided to maintain power if an electrical supply is shut off. A charging system (not shown) for battery 324 can be provided upon a circuit board 308 where battery 324 is intended to be rechargeable. For convenience, the foregoing devices are all designated as 'sensors' herein and are designated generally by either reference 48 or 50. Sensors designated with reference 48 refer generally to transmitters if they transmit a signal or other emission, and sensors designated with reference 50 refer generally to receivers if they receive a signal or other emission.

FIGS. 12-14 depict three different shaped covers 312 for fixture 300, including shallow convex, increased height convex, and angled, respectively. As only a cover portion is visible, the décor of fixture 300 is easily altered for a desired appearance. Additionally apparent is that release button 150 can be shaped to correspond to the shape. It may further be seen that additional internal space can be created where cover 312 has a greater height. Cover 312 can have a width just sufficient to cover junction box 108 or may have a greater width to accommodate a decorative style, or to create additional space. As can be seen in FIG. 11, flange 320 and cover 312 have the same width, and mate to form a unitary flange/cover that is three dimensional, and mutually supports lever extension 162 and button 150.

Cover 312 thus provides a trim portion that is intended to extend below the surface of the ceiling into which the device is recessed. Accordingly, all of the structure described herein can be positioned to lie above the ceiling surface, as achieved by the correct length of arms 120 and a corresponding height of housing 302, except for the flange 320, if provided, which is intended to rest upon the surface of the ceiling. Ultimately, when a décor is chosen for the location, a cover 312 can be selected which best coordinates with the décor. Cover 312 can further be treated with paint, fabrics, or printed material to better coordinate with the décor, without requiring removal of the recessed components. A button 150 can be selected which matches the cover 312 chosen and can be affixed to the end of lever extension 162 by any known means, such as adhesive, interference fit, threading, clip, or other fastener type.

FIG. 15 depicts the cover 312 configuration of FIG. 12 together with a cross-sectional rendering of a fixture 330 which is similar to fixture 300 of FIGS. 10-11, differing in that boards 308 are not present, as LEDs 322 can operate at the incoming line voltage. It can be seen that there is additional space within junction box 108, or a smaller junction box can be used. FIG. 16 depicts a fixture 340 which is similar to fixture 330, however it depicts the cover configuration of FIG. 13. In addition, a central push button release is provided, in addition to the push button release provided by lever extension 162. However, it may be needed to remove lens 314 in order to access the push button release, unless fixture 340 does not include a lens cover or has a different configuration. FIG. 17 depicts a portion of fixture 340, but which includes the cover configuration of FIG. 14.

FIG. 18 depicts an embodiment of a recessed lighting system 400 that utilizes a plurality of embodiments such as are shown and described in FIGS. 10-11, and which are electrically coordinated. Each fixture 300 is supported in a junction box by bracket 36A, however the junction boxes 108 are not shown for clarity. Recessed lighting system 400 includes a first recessed lighting fixture 300A, a second recessed lighting fixture 300B, and a third recessed lighting fixture 300C. Although three recessed lighting fixtures are shown, system 400 can include any suitable number of fixtures. First fixture 300A can be a so-called smart fixture with one or more sensors 48/50 as described with respect to FIGS. 10-11. In the example shown, three lighting fixtures are coordinated, whereby the sensors 48/50 in fixture 300A can include a receiver for a remote control or other control device, and associated electronics for controlling turning on and off or dimming the three fixtures, or for changing a color of one or more of the fixtures. In this manner, only fixture 300A requires circuit boards 308 or sensors 48/50. However, fixtures 300B and 300C can also include these components, for the same or different purposes as compared to fixture 300A.

As shown in FIG. 18, fixture 300A is connected to wire 'L1' which is connected to line 1 or a hot connector from an electrical supply, such as wiring of a building. Wire 'G' is connected to a ground with respect to L1, and wire 'W' is connected to a neutral associated with L1. Fixtures 300B and 300C are not connected to L1, but instead are connected to 12' which is controlled by fixture 300A. Fixture emits a signal upon L2 corresponding to a desired lighting effect for fixtures 300A and 300B, which can be the same or different from fixture 300A. The signal upon L2 is modified by electronics mounted to boards 308 of fixture 300A. It should be understood that L2 can include a plurality of conductors for communicating different signals from fixture 300A to FIGS. 300B and 300C.

In an embodiment, L2 represents an Ethernet or fiberoptic connection, and can carry IP based or other network traffic, such as serial data. In an embodiment, L2 represents power over Ethernet (PoE). In a further embodiment, L2 represents separate power and data lines.

Referring now to FIG. 19, a base 324 of bracket 36B is affixed to plug 20 by any suitable means, such as threadable fastener, rivet, molding, pin, clip, or welding, as examples. Extension arms 120A extend from base 324 in a direction away from socket face 128. Base 324 has a width selected to position extension arms 120A adjacent to an inner surface of opposed sides 326 of junction box 108. Additionally, extension arms include a channel 328 sized to admit passage of box screw tabs 318 of junction box 108. In this manner, bracket 36B intrudes into the interior of junction box 108 do the smallest extent possible, and particularly, as minimal as the thickness of extension arm 120A.

In an embodiment, as shown, base 324 and extension arms 120A are formed from a single plate that is stamped or cut to remove material to create channels 328. At distal ends of channels 328, slits are formed whereby tabs 124A can be formed by simply bending the distal ends of extension arms 120A, as depicted in FIG. 19. Additional bends dispose extensions arms perpendicular to base 324 to form bracket tabs 338, through which tab apertures 332 are formed, whereby mounting screws can pass through tab apertures 332 and into box screw tabs 318. Extension arms 120A can be formed with a length that positions base 324 against a bottom surface of junction box 108, where maximum space is desired. Alternatively, a length of extension arms 120A can position plug 20 at a predetermined distance from an opening of junction box 108. As described with respect to extension arms 120 (FIGS. 4-5), and as shown in FIG. 17, extension arms 120A can be formed in two sections that are fastenable together to form different lengths, so that extension arms 120A can be field adjustable.

Figure 21:
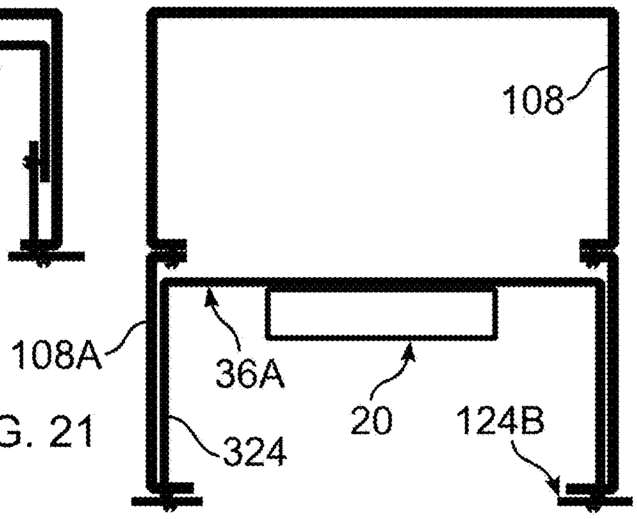
FIG. 21 depicts a diagrammatic view a mounting bracket of the disclosure mounted within a junction box extension ring.
Figure 22:
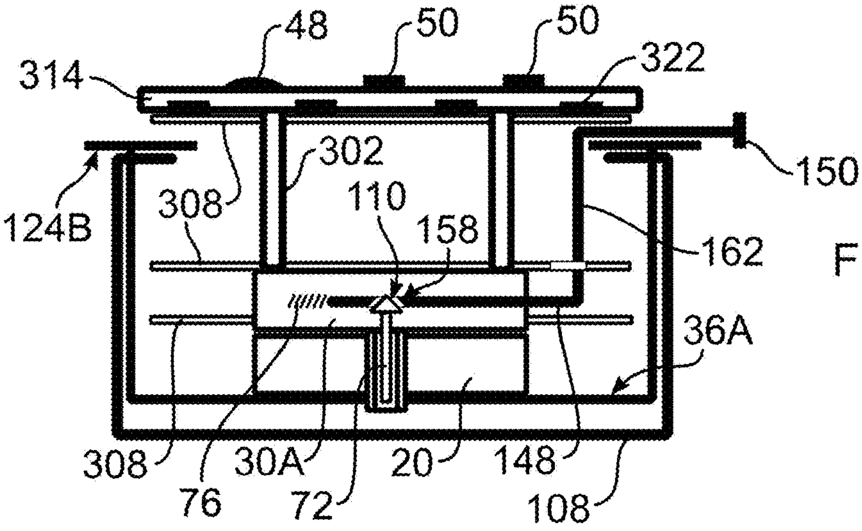
FIG. 22 depicts a diagrammatic view of a device similar to that of FIG. 10, further including sensors of the disclosure.

In FIG. 20, the embodiment of FIG. 19 is diagrammatically illustrated, with two-part extension arms 120A, where extension arm extender 334 attaches to a shortened extension arm 120B. Arm extender 334 and shortened extension arm 120B can mutually attach by any known means, including threaded fastener, clip, clamp, or other connection. Either or both of extender 334 or arm 120B can include multiple openings for a fastener, enabling a plurality of combined lengths, for example corresponding to frequently used junction box 108 sizes. FIG. 21 illustrates deployment of the embodiment of FIG. 19 or 20 within an extension ring style electrical enclosure, which is similar to a junction box having an open bottom. In this manner, there is additional space for wires and connectors, however plug 20 is at a correct height for installation of a fixture including plug 30.

Figure 23:
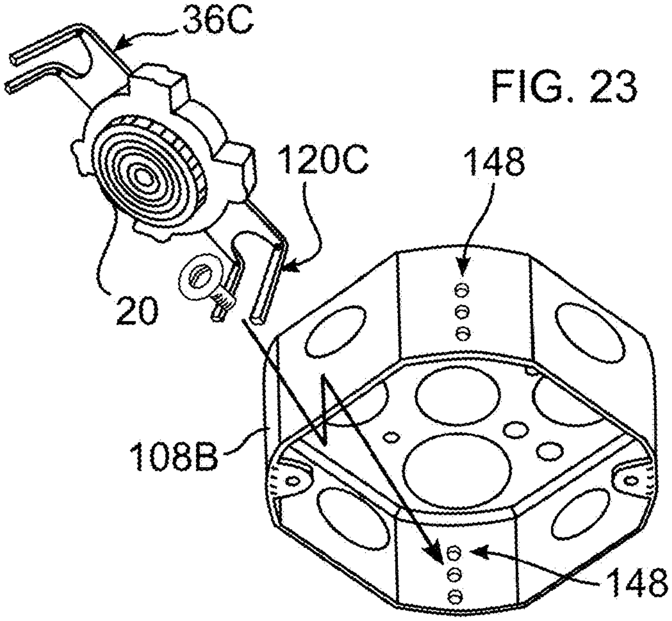
FIG. 23 depicts an alternative bracket and junction box of the disclosure, the bracket selectively connectable to apertures formed in the junction box.

In FIG. 23, junction box 148 is provided with a plurality of vertically aligned apertures 336, disposed on opposed facing inner sides of junction box 108B, which can be threaded. Bracket 36C extension arms 120C form a gap through which a screw may pass and thread into a selected one of apertures 148. In this manner, a precise vertical alignment of socket 20 can be carried out. As bracket 36C is affixed via apertures 336, tabs 338 can be absent, as shown, or can optionally be provided for additional or alternative attachment. As an alternative to the slotted extension arms 120C, one or more apertures can be provided in extension arm 120 or 120A.

Figure 24:
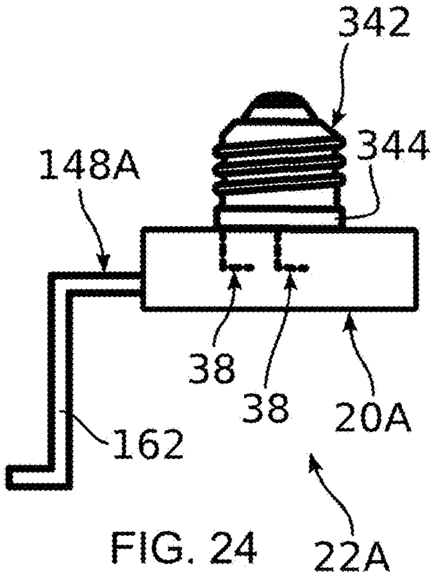
FIG. 24 depicts a socket with an extended lever of the disclosure, affixed to an Edison style plug, the assembly releasable from a recessed junction box as disclosed for other embodiments herein.

In FIG. 24, in an embodiment of the disclosure, socket 20A is mechanically and electrically connected to an Edison type base. The combined device 22A can be screwed into a standard unmodified recessed lighting fixture (not shown) to form a mechanical and electrical connection. Socket conductors 38 are electrically connected to the neutral and hot contacts of the Edison connector. Otherwise, socket 20A is identical to the socket 20 of FIG. 8 or other socket described herein with a release lever 148/148A, which facilitates release of socket 20A when device 22A is recessed within the standard recessed fixture. Neck 344 can be sized to enable a desired overall height of device 22A. Likewise, a height of lever extension 162 can be sized, or can be adjustable, for example as by threading, as needed for a particular application, to position a distal end of the lever where it can be pushed by a user.

All references cited herein are expressly incorporated by reference in their entirety. There are many different features of the present disclosure and it is contemplated that these features may be used together or separately. Unless mention was made above to the contrary, it should be noted that all of the accompanying drawings are not to scale. Thus, the disclosure should not be limited to any particular combination of features or to a particular application of the disclosure. Further, it should be understood that variations and modifications within scope of the disclosure might occur to those skilled in the art to which the disclosure pertains. Accordingly, all expedient modifications readily attainable by one versed in the art from the disclosure set forth herein that are within the scope of the present disclosure are to be included as further embodiments of the present disclosure.

| Reference Numerals |
|---|
| 20, 20A socket |
| 22, 22A quick connect device |
| 24, 24A spindle asm |
| 26 plug body |
| 30, 30A plug |
| 32 plug connector ring |
| 34 socket recess |
| 36, 36A, 36B, 36C bracket |
| 38 socket conductor |
| 48 sensor/input |
| 50 sensor/output |
| 68 socket barrel |
| 70/70A plug barrel |
| 72 latch ball |
| 74 latch pin |
| 76 pin spring |
| 78 pin recess |
| 102 electrical fixture |
| 104 lever channel |
| 106 return spring |
| 108, 108A junction box |
| 110 cam follower |
| 112 socket body |
| 114 post recess |
| 116 socket bushing |
| 118 spindle ledge |
| 120, 120A, 120B, 120C extension arm |
| 122 flange aperture |
| 123 plug teeth |
| 124, 124A bracket flange |
| 126 socket notch |
| 128 socket face |
| 130 socket teeth |
| 132 connection tab |
| 134 electrical connector |

-continued

| Reference Numerals |
|---|
| 138 plug cavity |
| 144 retention post |
| 146 retention slot |
| 148 release lever |
| 150 release button |
| 156 latch pin end |
| 158 cam surface |
| 160 side release plug |
| 162 lever extension |
| 200 ceiling |
| 300, 300A-C electrical fixture |
| 302 fixture housing |
| 308 electronic circuit board |
| 310 signal transmitter/receiver |
| 312 fixture cover |
| 314 lens |
| 316 lens bracket |
| 318 box screw tab |
| 320 fixture flange |
| 322 LED |
| 324 bracket base |
| 326 box side |
| 328 bracket channel |
| 330 alt. fixture |
| 332 tab aperture |
| 334 arm extender |
| 336 box apertures |
| 338 bracket tab |
| 340 alt. fixture |
| 342 edison base |
| 344 extender neck |

What is claimed is:

1. A plug for coupling with a socket to form a device for connecting a recessed electrical fixture with electrical power supply wiring located at or near an electrical junction box positioned such that a face of the electrical junction box is substantially flush with a work surface, and for mounting the fixture on the electrical junction box, with the fixture including a housing, the plug comprising:

at least one male connector electrically connected to the fixture and engageable with a contact terminal within the socket to establish a circuit between the electrical fixture and the electrical power wiring; and a releasable latch carried on the combination of the plug and the socket for releasably securing the plug to the socket, wherein the plug and socket are configured and dimensioned such that the housing is recessed at least partially inside the electrical junction box and a first distal end of the housing is positioned against the work surface, wherein the plug includes:

a body affixed to a second distal end of the housing, which is opposite the first distal end, a plurality of concentric ring-shaped electrical connectors positioned upon the body to define an insertion face of the plug, an elongate centrally disposed barrel defining a longitudinal axis and having at least one transverse channel, a latch pin slidable within the barrel, the latch pin having at least one radial recess, and at least one ball disposed within the transverse channel and contactable by the latch pin, the latch pin slideable to alternately position the ball adjacent a radial recess and not adjacent a radial recess, wherein the plug further includes a release lever that is configured to slide within a lever channel in the body of the plug, the release lever:

being slideable within the lever channel in the body of the plug along an axis transverse to the longitudinal axis of the barrel, having a cam surface that is configured to slide against a cam follower located at an end of the latch pin when the release lever slides within the lever channel so as to alternately push the latch pin to position a radial recess adjacent to a ball and to a position where the radial recess is not adjacent to a ball, and extending from within the lever channel to outside of the body of the plug, and including a lever extension that extends away from the plug in a direction away from the insertion face of the plug, the lever extension being configured and dimensioned to extend beyond the work surface so that a distal end of the release lever is pushable to release the plug from the socket when the housing is at least partially recessed inside the electrical junction box, and wherein the fixture includes an LED PCB light source.

2. The plug of claim 1, wherein the plug and socket are configured and dimensioned such that the fixture is not positioned within a recessed lighting housing.

3. The plug of claim 1, wherein the plug and socket are configured such that the cam follower and the cam surface are positioned at a distance away from the work surface.

4. The plug of claim 1, wherein the cam surface is positioned within the lever channel in the body of the plug.

5. A device for connecting a recessed electrical fixture with electrical power supply wiring located at or near an electrical junction box positioned such that a face of the electrical junction box is substantially flush with a work surface, and for mounting the fixture on the electrical junction box, with the fixture including a housing, the device comprising:

a socket including a socket body having at least one internal cavity therein, the socket configured and dimensioned to be positioned in the electrical junction box and securable to the electrical junction box;

an electrically conductive contact terminal disposed within the cavity for establishing an electrical connection between the electrical power supply wiring and the socket;

a plug fixable to the fixture and insertable into the socket, the plug comprising at least one male connector electrically connected to the fixture and engageable with a contact terminal within the socket to establish a circuit between the electrical fixture and the electrical power wiring; and a releasable latch carried on the combination of the plug and the socket for releasably securing the plug to the socket, wherein the plug and socket are configured and dimensioned such that the housing is recessed at least partially inside the electrical junction box and a first distal end of the housing is positioned against the work surface, wherein the plug includes:

a body affixed to a second distal end of the housing, which is opposite the first distal end, a plurality of concentric ring-shaped electrical connectors positioned upon the body to define an insertion face of the plug, an elongate centrally disposed barrel defining a longitudinal axis and having at least one transverse channel, a latch pin slidable within the barrel, the latch pin having at least one radial recess, and at least one ball disposed within the transverse channel and contactable by the latch pin, the latch pin slideable to alternately position the ball adjacent a radial recess and not adjacent a radial recess, wherein the plug further includes a release lever that is configured to slide within a lever channel in the body of the plug, the release lever:

being slideable within the lever channel in the body of the plug along an axis transverse to the longitudinal axis of the barrel, having a cam surface that is configured to slide against a cam follower located at an end of the latch pin when the release lever slides within the lever channel so as to alternately push the latch pin to position a radial recess adjacent to a ball and to a position where the radial recess is not adjacent to a ball, and extending from within the lever channel to outside of the body of the plug, and including a lever extension that extends away from the plug in a direction away from the insertion face of the plug, the lever extension being configured and dimensioned to extend beyond the work surface so that a distal end of the release lever is pushable to release the plug from the socket when the housing is at least partially recessed inside the electrical junction box, and wherein the fixture includes an LED PCB light source.

6. The device of claim 5, wherein the LED PCB includes a cover.

7. The device of claim 5, wherein the housing includes a flange sized wider than a maximum width of the face of the electrical junction box, the flange being positioned against the work surface.

8. The device of claim 6, wherein a body of the cover is transparent or translucent and the rim is opaque.

9. The device of claim 7, wherein all of the housing except the flange is positioned so as to be recessed within the electrical junction box.

10. The device of claim 9, wherein the flange is positioned so as to rest upon the work surface.

11. The device of claim 6, wherein the cover includes a lens, filter, or other optical element to create a lighting effect.

12. The device of claim 6, wherein the light source and cover both have a flat profile, or wherein at least one of the light source and cover has a domed profile.

13. The device of claim 5, wherein the socket includes a mounting strap attached to the socket body for securing the socket to the electrical junction box.

14. The device of claim 13, wherein the mounting strap is generally U-shaped with two legs.

15. The device of claim 14, wherein the length of the legs is at least twice the height of the socket body, so that the socket is mounted at a distance away from the face of the electrical junction box with space remaining for recessing the housing within the electrical junction box.

16. The device of claim 14, wherein the length of the legs is about the same as the height of the socket body.

17. The device of claim 16, wherein the electrical junction box includes a first series of vertically spaced holes and a second series of vertically spaced holes for attaching the mounting strap to the electrical junction box, with the first and second series of vertically spaced holes on facing surfaces of the electrical junction box.

18. The device of claim 5, wherein the plug and socket are configured and dimensioned such that the fixture is not positioned within a recessed lighting housing.

19. The device of claim 5, wherein the plug and socket are configured and dimensioned such that an entirety of the plug is recessed within the electrical junction box.

* * * * *